(12) United States Patent
Shannon

(10) Patent No.: US 11,885,354 B2
(45) Date of Patent: Jan. 30, 2024

(54) REUSABLE ADHESIVE MOUNT DEVICE FOR PORTABLE ELECTRONICS

(71) Applicant: Flipstik, LLC, Saint Louis, MO (US)

(72) Inventor: Akeem Shannon, Saint Louis, MO (US)

(73) Assignee: Flipstik, LLC, St. Louis, MO (US)

( * ) Notice: Subject to any disclaimer, the term of this patent is extended or adjusted under 35 U.S.C. 154(b) by 0 days.

(21) Appl. No.: 17/851,849

(22) Filed: Jun. 28, 2022

(65) Prior Publication Data

US 2022/0325737 A1 Oct. 13, 2022

Related U.S. Application Data

(63) Continuation-in-part of application No. 16/232,707, filed on Dec. 26, 2018, now Pat. No. 11,371,649.

(60) Provisional application No. 62/634,146, filed on Feb. 22, 2018.

(51) Int. Cl.
  *F16B 11/00* (2006.01)
  *A45F 5/10* (2006.01)
  *F16M 11/24* (2006.01)

(52) U.S. Cl.
  CPC ............. *F16B 11/006* (2013.01); *A45F 5/10* (2013.01); *F16M 11/242* (2013.01); *A45F 2200/0516* (2013.01); *F16M 2200/08* (2013.01)

(58) Field of Classification Search
  CPC ... F16B 11/06; F16M 11/242; F16M 2200/08; A45F 5/10; A45F 2200/0516
  See application file for complete search history.

(56) References Cited

U.S. PATENT DOCUMENTS

| | | | |
|---|---|---|---|
| 6,508,451 B1 | 1/2003 | Blythe et al. | |
| 6,695,273 B2 | 2/2004 | Iguchi | |
| 7,513,472 B2 * | 4/2009 | Yang | F16M 11/041 248/316.1 |
| 7,845,612 B2 * | 12/2010 | Mase | H05K 5/0204 248/176.1 |
| 7,910,188 B2 * | 3/2011 | Wheatley | B60R 11/00 428/41.5 |
| 8,070,026 B2 * | 12/2011 | Wadsworth | F16M 13/022 224/269 |
| 8,124,216 B2 | 2/2012 | Antonini | |
| 8,172,191 B1 * | 5/2012 | Zimbalatti | F16M 11/10 248/688 |

(Continued)

FOREIGN PATENT DOCUMENTS

IT 201900005286 A1 10/2020

OTHER PUBLICATIONS

International Search Report and Written Opinion for PCT/US2022/035341 dated Sep. 23, 2022.

*Primary Examiner* — Monica E Millner
(74) *Attorney, Agent, or Firm* — Thompson Coburn LLP; Thaddeus J. Blenke

(57) ABSTRACT

A device having a top half and a bottom half divided by a hinge mechanism is provided. The top half may contain a graphic image and be used as a protective cover or kickstand, and the bottom half contains a reusable elastomeric adhesive. The adhesive can be on both sides of the bottom half. The device can be used to mount any flat, non-porous or semi-porous object to another flat, non-porous or semi-porous surface or object. The shape and size of the device does not affect its functionality and can therefore be modified as needed.

19 Claims, 30 Drawing Sheets

(56) References Cited

U.S. PATENT DOCUMENTS

| | | |
|---|---|---|
| 8,844,098 B2 | 9/2014 | Karmatz |
| 9,259,077 B2 | 2/2016 | Murphy et al. |
| 9,277,038 B1 | 3/2016 | Wheatley |
| 9,300,346 B2 | 3/2016 | Hirsch |
| 9,316,344 B2 * | 4/2016 | Le Gette ................ A45F 5/02 |
| 9,565,909 B2 | 2/2017 | Song et al. |
| 9,681,718 B1 * | 6/2017 | Poole ................ F16M 11/041 |
| 9,723,735 B1 * | 8/2017 | Kim ................... F16M 11/041 |
| 10,368,628 B1 | 8/2019 | Durfee, Jr. |
| D904,388 S * | 12/2020 | Martin ........................ D14/253 |
| 2003/0089832 A1 * | 5/2003 | Gold ................... G06F 1/1632 |
| | | 248/454 |
| 2005/0205623 A1 * | 9/2005 | Buntain ................... A45F 5/00 |
| | | 224/217 |
| 2006/0121250 A1 | 6/2006 | Wheatley |
| 2008/0314941 A1 * | 12/2008 | Knych ................. H04B 1/385 |
| | | 224/191 |
| 2009/0120980 A1 * | 5/2009 | Calayo ..................... A45F 5/02 |
| | | 224/267 |
| 2010/0122756 A1 | 5/2010 | Longinotti-Buitoni |
| 2010/0222118 A1 | 9/2010 | Interdanato |
| 2011/0077061 A1 | 3/2011 | Danze et al. |
| 2011/0192857 A1 * | 8/2011 | Rothbaum ............ F16M 11/041 |
| | | 248/220.21 |
| 2011/0266316 A1 | 11/2011 | Ghalib et al. |
| 2011/0294556 A1 | 12/2011 | Carlberg et al. |
| 2012/0031937 A1 | 2/2012 | Baker |
| 2012/0168336 A1 | 7/2012 | Schmidt et al. |
| 2012/0188693 A1 | 7/2012 | Chiang et al. |
| 2012/0267402 A1 | 10/2012 | Beatty |
| 2012/0305735 A1 * | 12/2012 | McSweyn ................ H04M 1/04 |
| | | 156/60 |
| 2014/0251368 A1 | 9/2014 | Lawson et al. |
| 2014/0364176 A1 * | 12/2014 | Pintor .................... H04B 1/385 |
| | | 455/575.6 |
| 2016/0039357 A1 | 2/2016 | Jang |
| 2016/0049983 A1 * | 2/2016 | Ripka ..................... H04M 1/04 |
| | | 455/575.6 |
| 2016/0134733 A1 * | 5/2016 | Murphy ..................... A45F 5/00 |
| | | 455/575.6 |
| 2016/0345715 A1 | 12/2016 | Lin et al. |
| 2016/0373152 A1 * | 12/2016 | Schmidt ............... F16M 11/105 |
| 2017/0142846 A1 | 5/2017 | Dordan |
| 2017/0223161 A1 * | 8/2017 | Lau ........................ F16M 11/10 |
| 2018/0146078 A1 * | 5/2018 | Shin ........................ F16F 1/043 |
| 2018/0235338 A1 * | 8/2018 | Lamb .................. A45C 13/001 |
| 2019/0098968 A1 | 4/2019 | Quintero et al. |

* cited by examiner

REUSABLE ADHESIVE MOUNT DEVICE FOR PORTABLE ELECTRONICS

CROSS-REFERENCE AND PRIORITY CLAIM TO RELATED PATENT APPLICATIONS

This continuation-in-part application claims priority to U.S. Non-Provisional patent application Ser. No. 16/232,707, filed Dec. 26, 2018 and now U.S. Pat. No. 11,371,649, entitled "Reusable Adhesive Mount Device for Portable Electronics", and also claims priority to and the benefit of U.S. Provisional Patent Application No. 62/634,146 filed Feb. 22, 2018, the entire disclosures of which are incorporated herein by reference.

INTRODUCTION

The present disclosure is generally directed to a device that can be mounted to a back surface of a smartphone or other small electronic apparatus, and more particularly, to a device that includes a first portion and second portion connected to the first portion by a hinge that can be mounted to a smart phone to keep the smartphone in an upright position.

We use our smartphones and portable electronics often. For example, we use them to watch videos, take "selfies," play games, listen to music, make phone calls, etc.

There are a number of drawbacks with traditional smartphones or similar devices. In some instances, we want to use our devices while also freeing up the use of our hands. While some devices offer the ability to prop the device using a "kickstand" there are often no surfaces (i.e., tables countertops) on which to prop the device. One option to cure this problem is to carry a tripod with you everywhere you go—however, this is highly impractical. Alternatively, one can use a traditional adhesive such as glue or duct tape to adhere the phone to a surface, but such adhesives are typically permanent and often cause damage to the surface or device.

In other instances, we are concerned with maintaining a firm grip on the smartphone to prevent it from falling. A dropped smartphone can result in cracked screens and other damage.

Typical cases used with smartphones are not conducive to carrying additional items. Such items must be kept in a wallet, purse, or other similar containers.

The present disclosure provides a device that can be connected to a smartphone or other similar device that overcomes some or all of such drawbacks associated therewith.

The present disclosure employs a reusable elastomeric adhesive to allow a user to mount a smartphone to nearly any non-porous or semi-porous flat surface including leather, mirrors, glass, metal, woods, tile, drywall, human skin and more. The present disclosure also offers a protective covering that doubles as a kickstand.

Sometimes we need to mount objects other than our smartphone, such as cooking utensils, keys, picture frames, and remotes. The present disclosure also allows the user to mount these devices to surfaces as well as to other objects.

The present disclosure's adhesive leaves no residue, and is completely reusable. It can be cleaned, and restored to full functionality by rinsing with running water.

In accordance with one aspect of the invention, a device that can be mounted to a portable electronic apparatus is provided. The device comprises a first portion and a second portion connected to the first portion by a hinge. The second portion includes a first side and an opposing second side. An adhesive material is provided on the first side of the second portion for connecting the second portion to an electronic device, such as a smart phone.

The adhesive can be a reusable adhesive. In this regard, it can be an elastomeric material. Other similar or suitable adhesives can also be used.

The first portion can be formed as a generally flat, planar sheet. Similarly, the second portion can be formed as a generally flat, planar sheet. The hinge can be a perforated portion between the first portion and the second portion. The first and second portions can be formed from plastic or other similar or suitable materials.

The device can further include a layer of a removable film covering the adhesive material on the first side of the second portion. This prevents the device from adhering to objects before it is placed on the smartphone or other objects.

The device can also include an adhesive material on the second side of the second portion to mount the device to a surface. In this instance, the device can also include a removable film covering the adhesive material on the second side of the second portion. When the device includes an adhesive on both sides of the second portion, it can be used to mount the smartphone (or other object the device is connected to—on the first side of the second portion) to another surface or object.

In operation, the first portion of the device is moveable about the hinge between a first closed configuration where the first portion is folded flat against the second portion and a second outward configuration where the first portion can support the electronic apparatus in an upright position. In the closed configuration, the first portion acts as a cover over the second surface of the second portion. This is important when the second surface includes an adhesive material.

The device can include a band connected to the first portion of the device, such as an elastic band. This allows a user to insert one or more fingers through the band to have a more secure grip on the smartphone or other object the device is connected to.

The device can also include a pocket formed in the first portion. The pocket can be sized to fit one or more credit cards or other similar cards or items. The band can be connected to an outer surface of the pocket.

The first portion can also include a graphical image or other indicia or designs. The image can be on one or both sides of the first portion.

In accordance with another aspect of the invention, a device comprises a top half and a bottom half divided by a perforated hinge mechanism. The top half contains a graphic image and can be used in one of a closed protective cover configuration and a kickstand configuration. The bottom half has a first side and a second side and a reusable elastomeric adhesive on both the first side and second side. An elastic band and/or a pocket can be part of the top half.

As used herein, directional words or phrases (e.g., top, bottom) are used with respect to the embodiments of the invention as shown and positioned in the Figures, and are not meant to limit the invention as being in such position(s).

The present device described herein allows a user to easily mount a smartphone to a wall. The device also allows a user to use it as a "kickstand."

The device also allows a user to mount household items such as knives, keys, picture frames, artwork, remotes as well as other household items to a wall or flat surface.

The device also allows a user to grip their phone (or other item) securely in their hand.

One portion of the device can be used to allow a user to protect an adhesive surface of the device with a cover that flips open.

The device also allows the user to display a printed graphic image on the cover of the device.

Further features and advantages of the disclosed embodiments, as well as the structure and operation of various elements of the disclosed embodiments, are described in detail below with reference to the accompanying drawings.

BRIEF DESCRIPTION OF THE DRAWINGS

The accompanying drawings, which are incorporated in and form a part of the specification, illustrate the disclosed embodiments and together with the description, serve to explain certain inventive principles. In the drawings.

DETAILED DESCRIPTION OF EXAMPLE EMBODIMENTS

Figure 1:
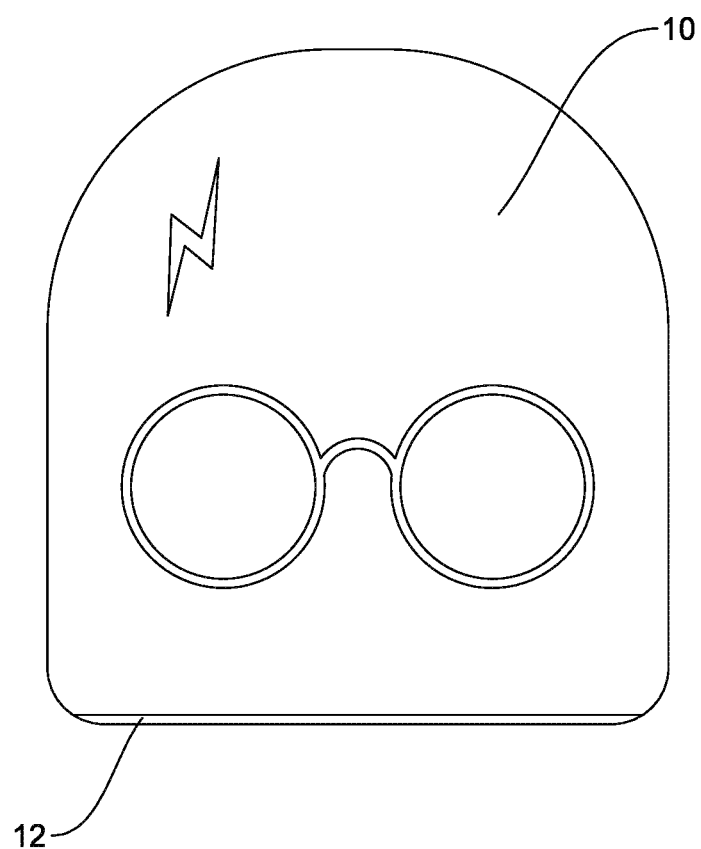
FIG. 1 is a front plan view of a top half of a reusable adhesive mount device of the present disclosure resting on a flat surface.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The following table lists elements of the illustrated embodiments of the invention and their associated reference numbers for convenience.

REF. NO.—ELEMENT 10 top half of invention frame
12 hinge
14a—reusable adhesive front
14b—reusable adhesive back
16 bottom-half of invention frame
18 protective film cover attached prior to use
30 elastic band
40a—front-half of sleeve
40b—back-half of sleeve
200—user hand
210—smartphone
220—credit cards
300—reusable adhesive mount device
305—top portion
310—bottom portion
315—band
320—appendage recess 325—hinge
330—band width
335—protrusion(s)
340—plate
345—reusable adhesive patch
350—first link
355—second link
360—adhesive layer
365—bottom portion rod
370—top portion rod
400—reusable adhesive mount device
405—top portion
410—bottom portion
415—band
420—appendage recess
425—second hinge
430—first hinge
435—protrusion(s)
440—bottom portion top surface
445—spinner
450—mounting plate
455—reusable adhesive patch
460—locking tab
465—track slot(s)
470—bottom surface pin
475—hinged extension
480—pin(s)
485—front band channel
490—back band channel
500—mounting plate track
505—locking recess FIG. 1 shows the front-top of a reusable adhesive mount device in accordance with the present disclosure. The frame of the invention is made with a plastic material. However, other similar or suitable materials can be used. The device includes a first or top half or portion 10 and a second or bottom half or portion 16. The top half 10 of the device has a permanently adhered graphic design that shows when the device is in the closed position or configuration. The top half 10 of the device is separated from a bottom half 16 of the device by a hinge 12. The hinge 12 may be a perforated portion of the material forming the top half 10 and the bottom half 16. While the plastic frame of the invention is preferably one solid piece, this perforated hinge 12 provides flexibility and functionality.

Figure 2:
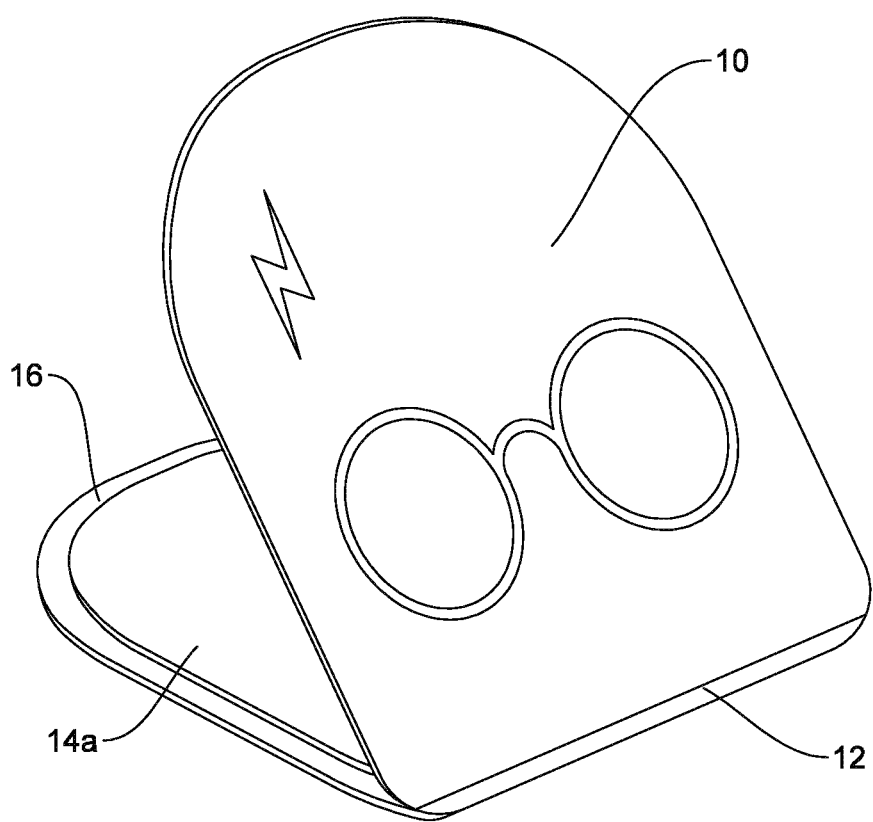
FIG. 2 is a perspective view of the device of FIG. 1.

FIG. 2 shows the top half of the device at an angle with respect to the bottom half of the device. The device is half-open, lying on a flat surface. The bottom half 16 of the device has a micro suction elastomeric adhesive material on either side 14a or 14b of the bottom half 16. The adhesive material is permanently attached to the device. Other suitable adhesives may also be used.

Figure 3:
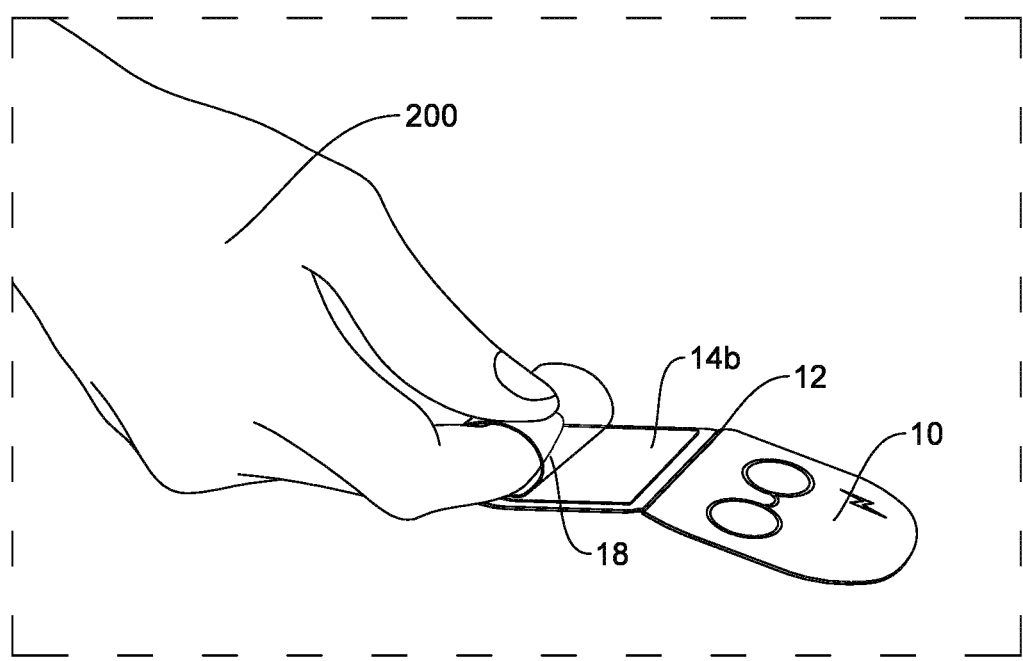
FIG. 3 is a perspective view of a user removing film from the adhesive section of the device of FIG. 1.

FIG. 3 shows the device lying open on a table with a user 200 removing a protective film 18 on one side 14b of the bottom half 16 (a separate film is covering the adhesive material on the other side 14a). The film 18 is used in the manufacturing and packaging processes and is discarded to expose the adhesive material 14b or 14a. The top half 10 of the device can be used as a protective covering for the adhesive material 14b or 14a after the film 18 has been discarded.

Figure 4:
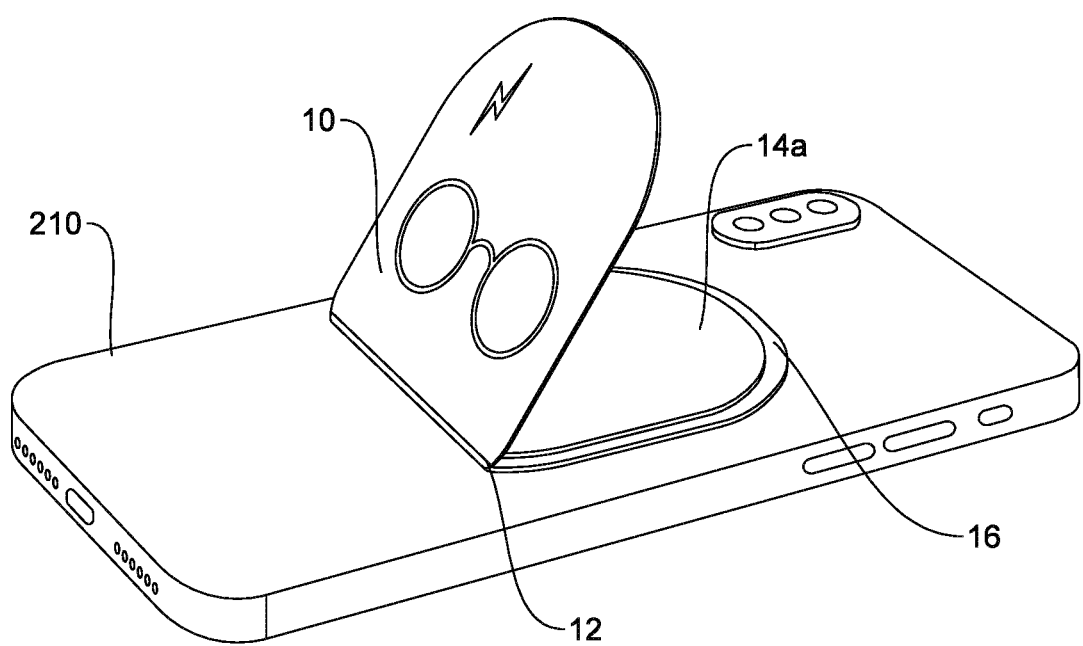
FIG. 4 is a perspective view of the device adhered to a smartphone in a half-open position.

FIG. 4 shows the device attached to a smartphone 210. The device is attached to the phone using the adhesive material on side 14b. The adhesive material 14a can be attached to any flat, non-porous or semi-porous surface to mount the device to said surface. The surface can be a wall, leather seat, mirror, glass, metal, wood etc. The adhesive material 14b is easily removable from the smartphone and can be relocated to another surface. The adhesive material 14a will hold the device in place unless the user forcibly attempts to dismount it. While shown mounted to a smartphone 210, the device of the present disclosure can be use with other small electronic devices or objects.

Figure 5:
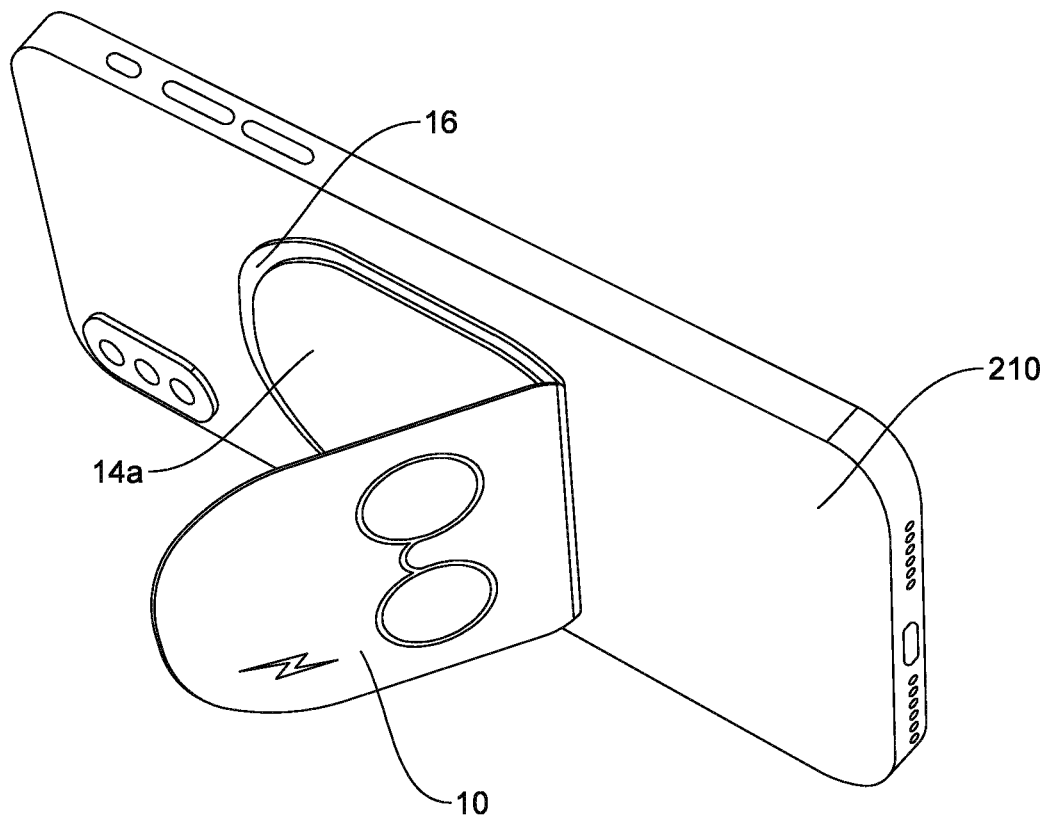
FIG. 5 is a perspective view of the device and smartphone of FIG. 4 with the device being used as a "kickstand" to prop up the smartphone.

FIG. 5 shows the device in a "kickstand" mode or configuration. The top half 10 of the device can be used to prop up the smartphone 210 when manipulation of the hinge 12 allows the device to rest at about a 90-degree angle relative to the smartphone 210. The screen of the smartphone is thus positioned in an upright position to enable viewing of videos, television, movies, or other similar content.

Figure 6:
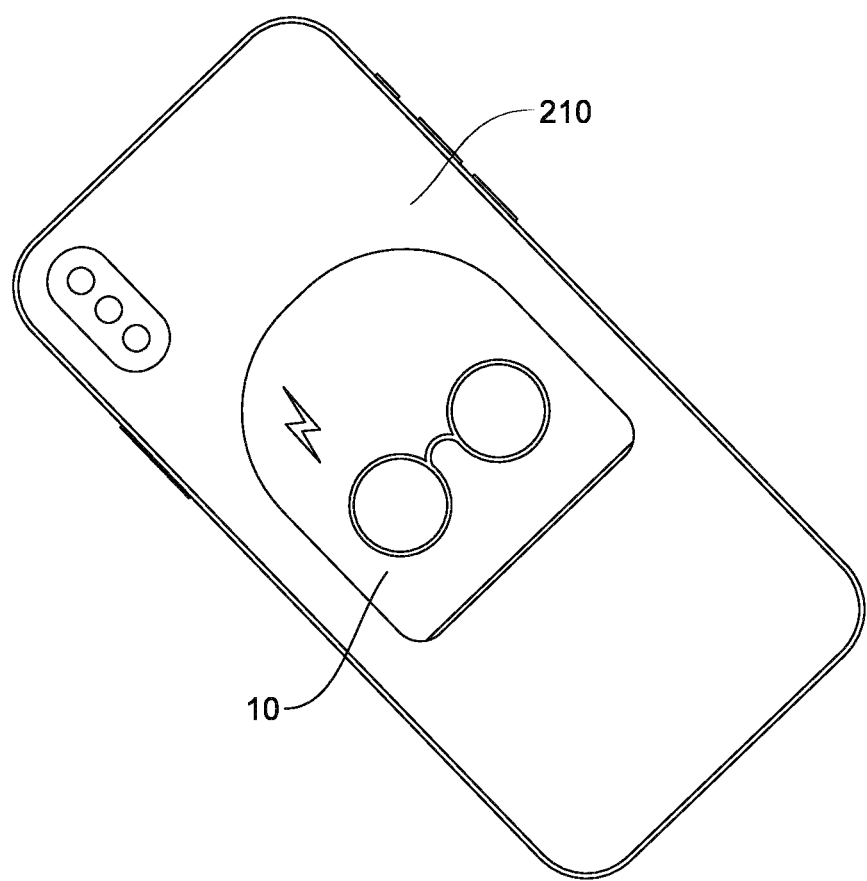
FIG. 6 is a top plan view of the device of FIG. 4 adhered to a smartphone in closed configuration.
Figure 7:
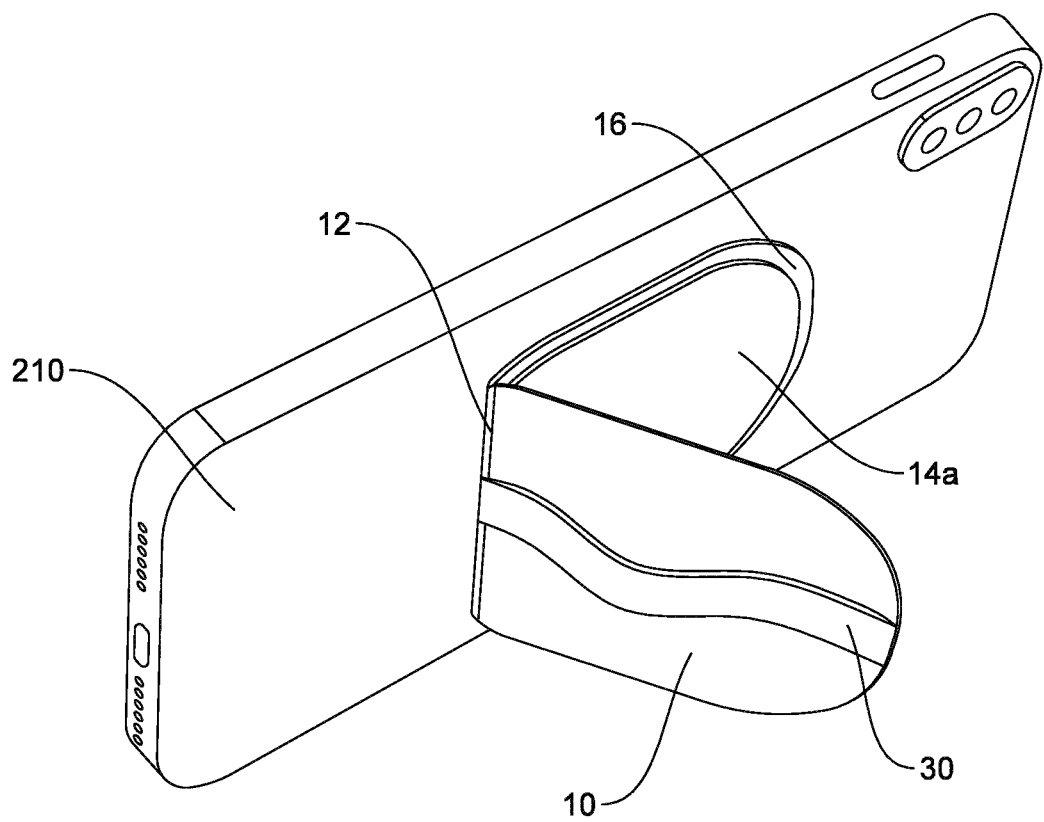
FIG. 7 is a perspective view of another aspect of the device in a "kickstand" configuration.
Figure 8:
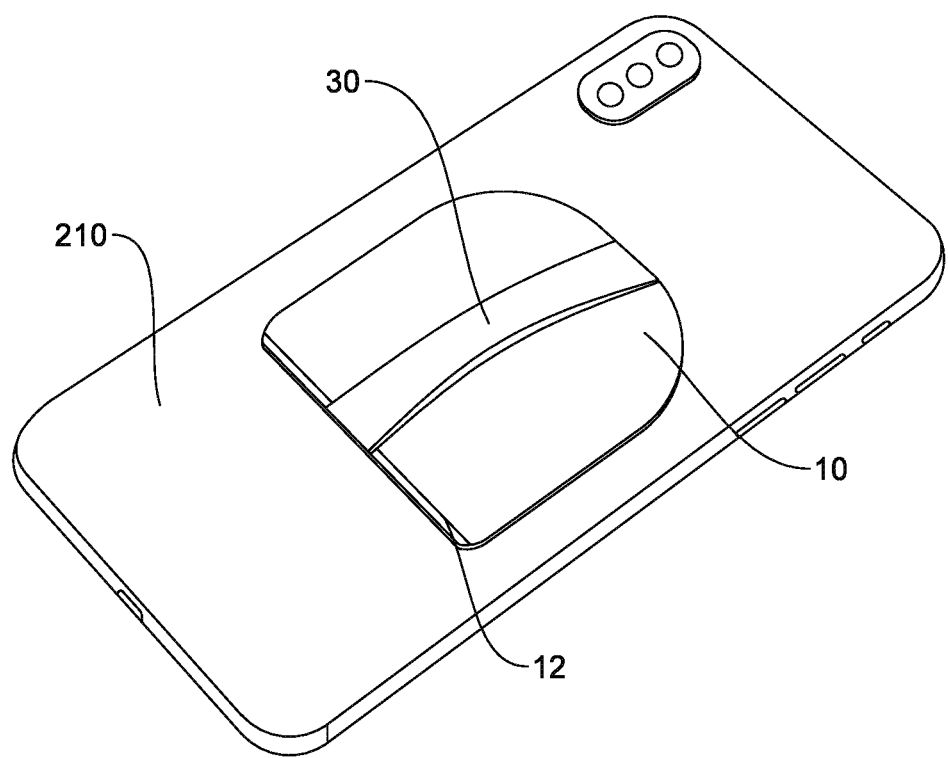
FIG. 8 is a top perspective view of the device of FIG. 7 in a closed configuration.
Figure 9:
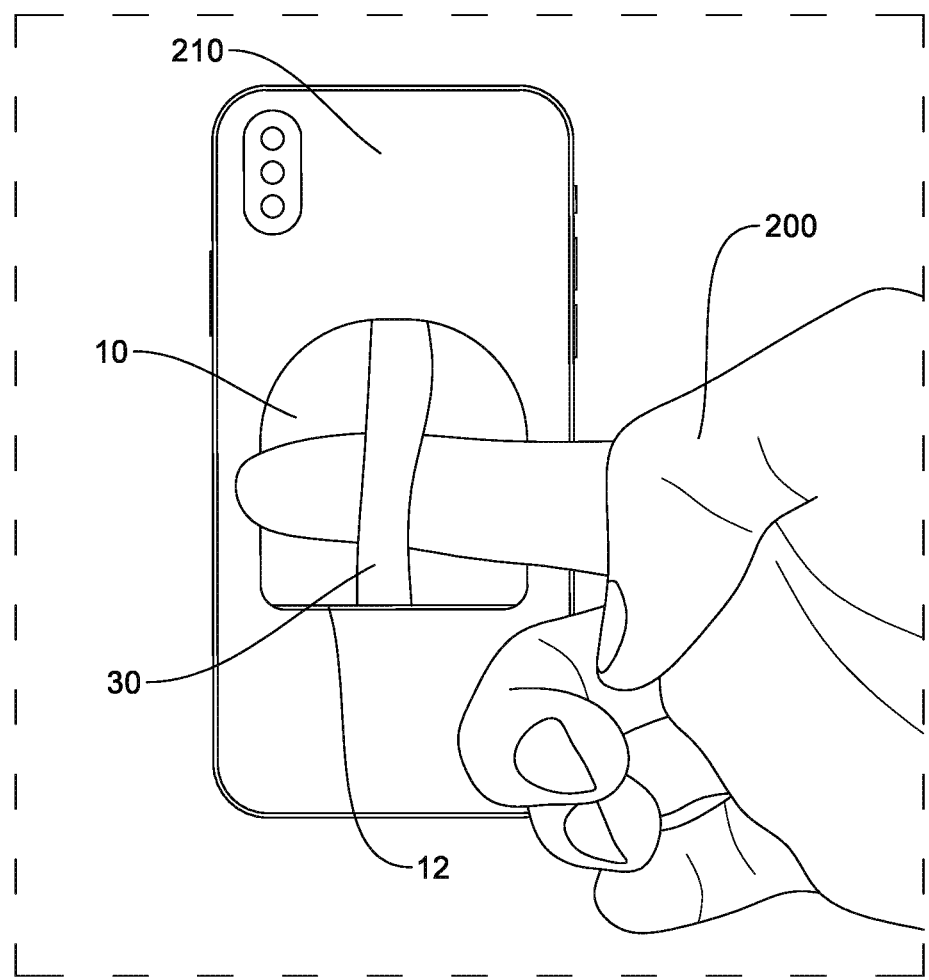
FIG. 9 is a perspective view of the device of FIG. 7 with a user's finger in a band on the device.
Figure 10:
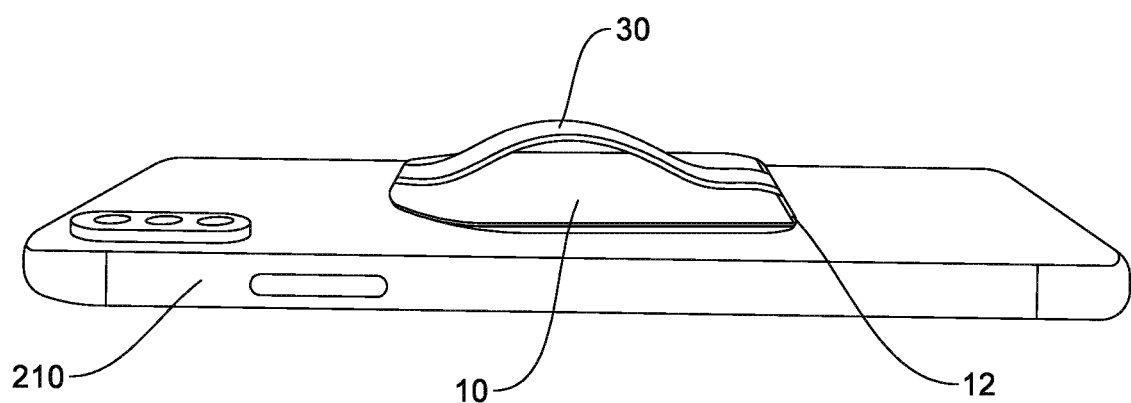
FIG. 10 is a side perspective view of the device of FIG. 7.

FIG. 6 shows the invention in a closed position or configuration. This means the front top half 10 faces outward, while protecting the reusable adhesive side 14a, which is attached to the outwardly facing side of the bottom half 16 of the device. The reusable adhesive of the other side 14b of the bottom portion 16 is attached to the smartphone 210.

The invention has several uses when attached to a smartphone or another device or object. The reusable adhesive 14a allows the user to mount the smartphone or another device to a wall or vertical surface. The reusable adhesive leaves no residue and can be cleaned by simply running water over the adhesive surface. This allows the user to take "selfies" (self-portrait photos), watch videos, or do any task without the need to hold the phone with their hands. The top half 10 of the invention works as a protective cover to keep the adhesive 14a clean when not in use, it also doubles as a kickstand 10. The entire frame of the invention, both the top 10 and bottom 16 halves can be cut to any shape or size and are not limited to the shape and size pictured. The graphic image 10 on the top half 10 of the invention can be printed with any graphic image or design. The graphic image shown in the figures is for illustration purposes and is not a limitation of the invention.

The adhesive sides 14a and 14b of the bottom portion 16 can be used to mount many items other than electronic devices. Any flat, non-porous or semi-porous object can be mounted to any flat, non-porous or semi-porous surface or object. This means that you can attach two objects together such as a pencil to a notebook or a portable battery pack to a tablet. Non electronic devices such as picture frames can be easily mounted to a wall, then removed easily. Due to the reusable nature of the adhesive material on the sides 14a and 14b. The invention can be reused over and over.

The reusable adhesive side 14a can also serve as a grippy material for the user to maintain a device such as smartphone 210 or tablet in their hand. The adhesive material 14a will allow the user to stick the invention to his or her hand, while also maintaining adhesion to the device using in the back adhesive side 14b.

Figure 11:
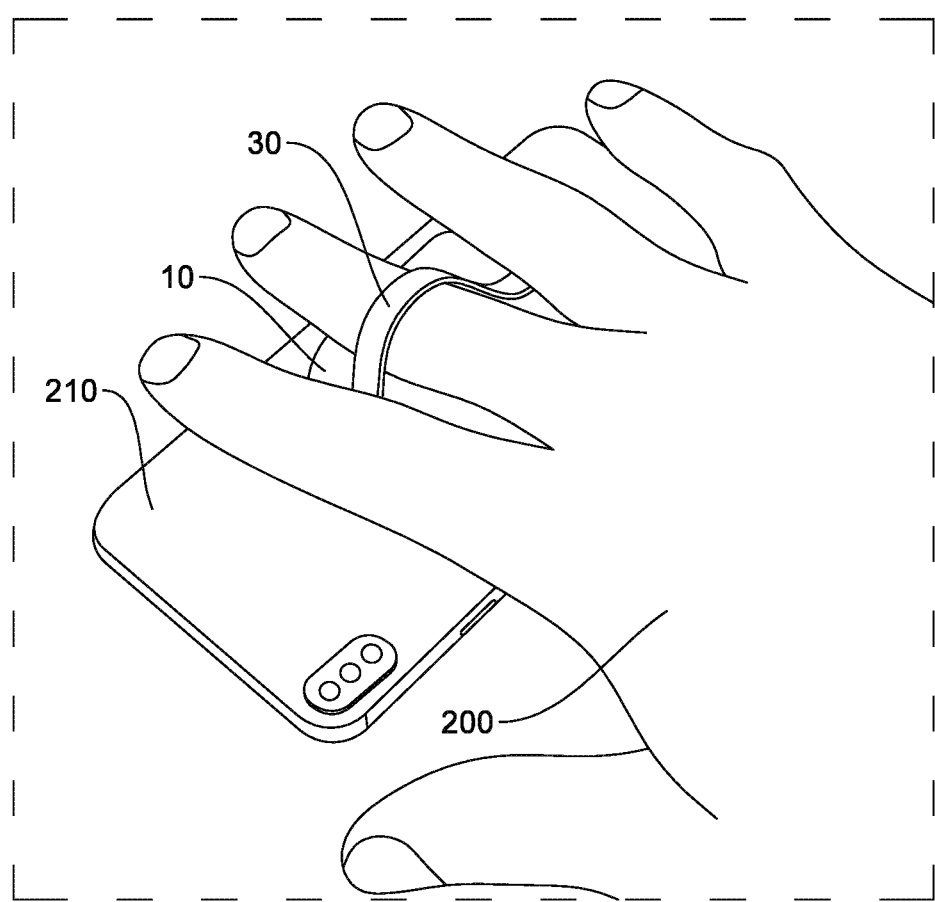
FIG. 11 is a top perspective view of the device of FIG. 7 held by a user's hand.
Figure 12:
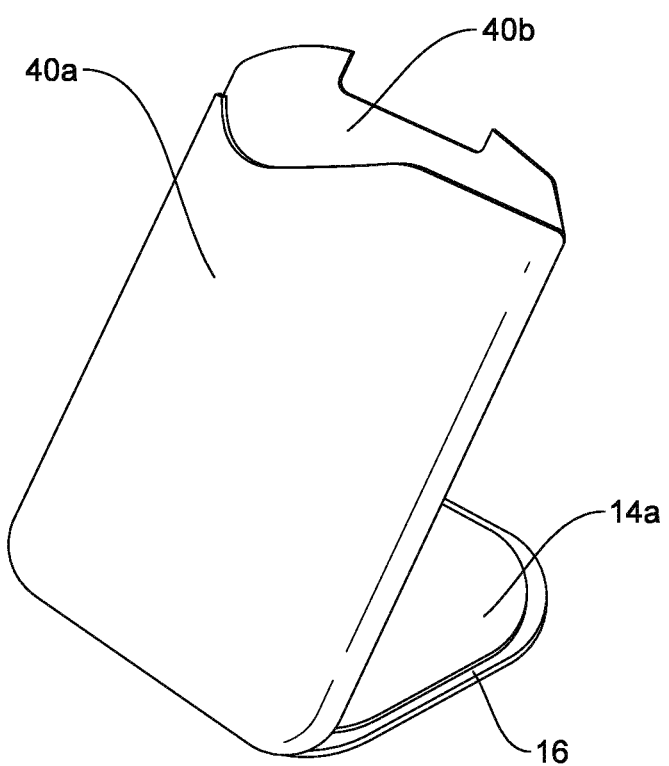
FIG. 12 is a perspective view of another aspect of the device having a pocket.
Figure 13:
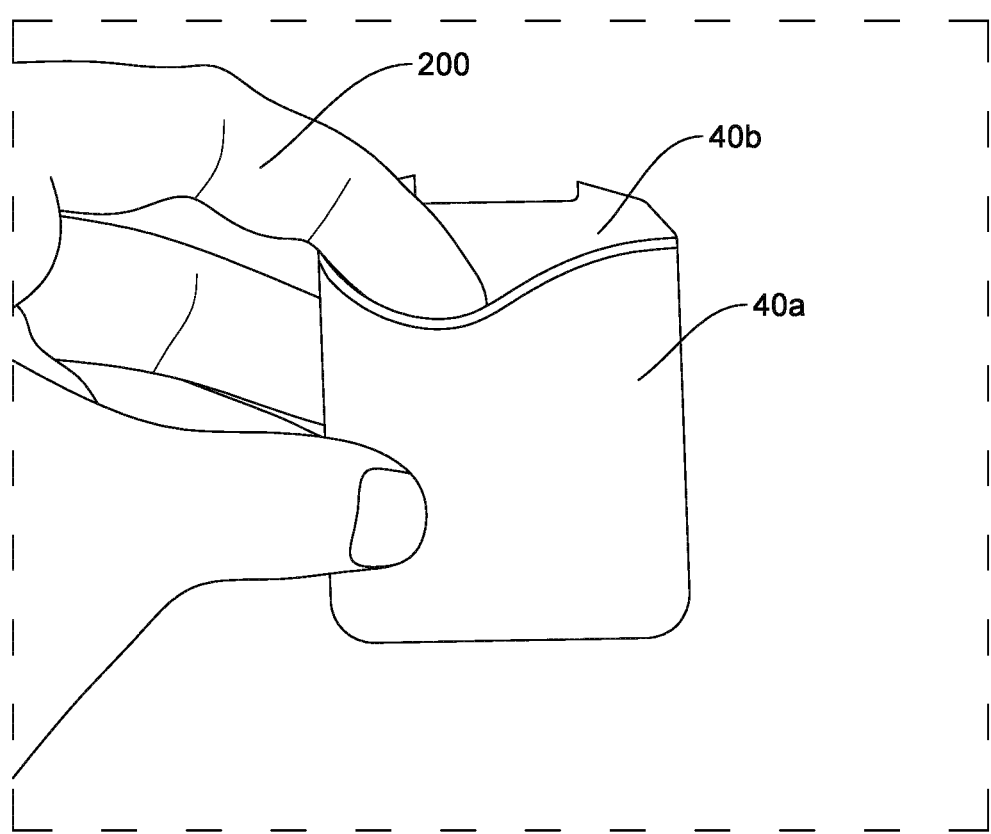
FIG. 13 is a perspective view of the device of FIG. 12 illustrating an opening of the pocket.
Figure 14:
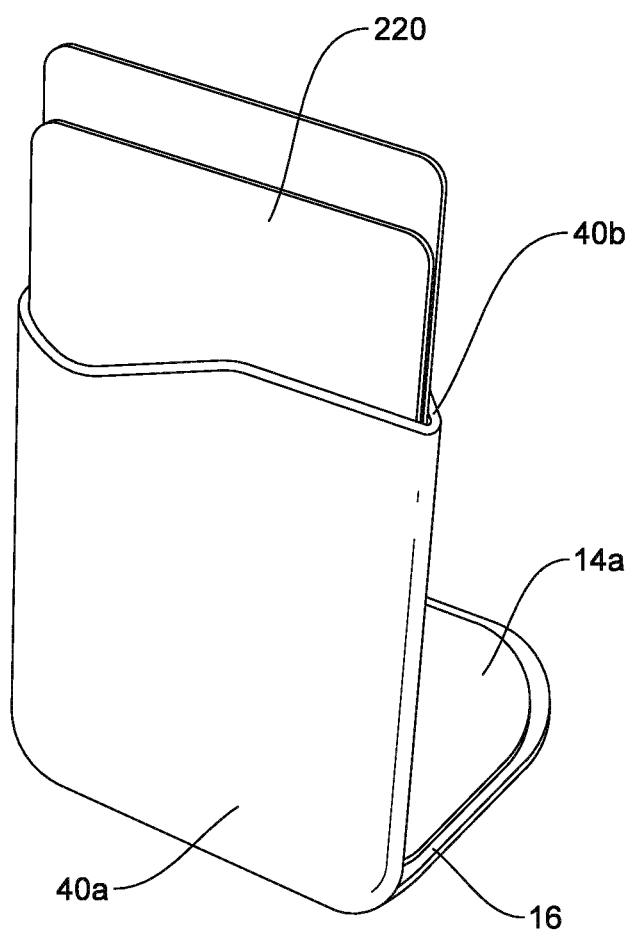
FIG. 14 is a perspective view of the device of FIG. 12 holding credit cards.
Figure 15:
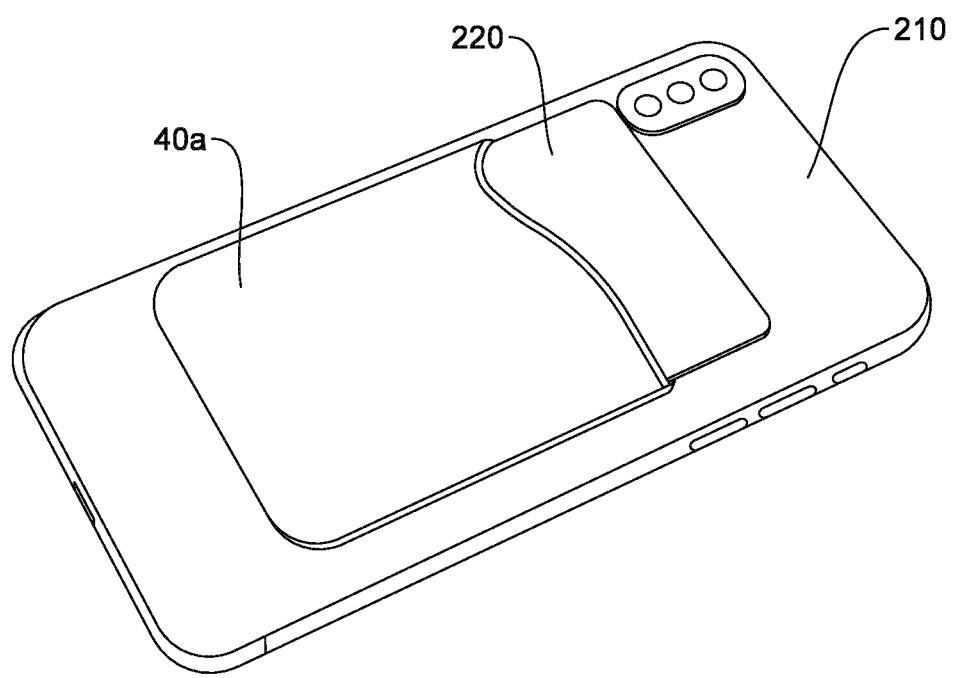
FIG. 15 is a top perspective view of the device of FIG. 14 holding the credit cards in a closed configuration.
Figure 16:
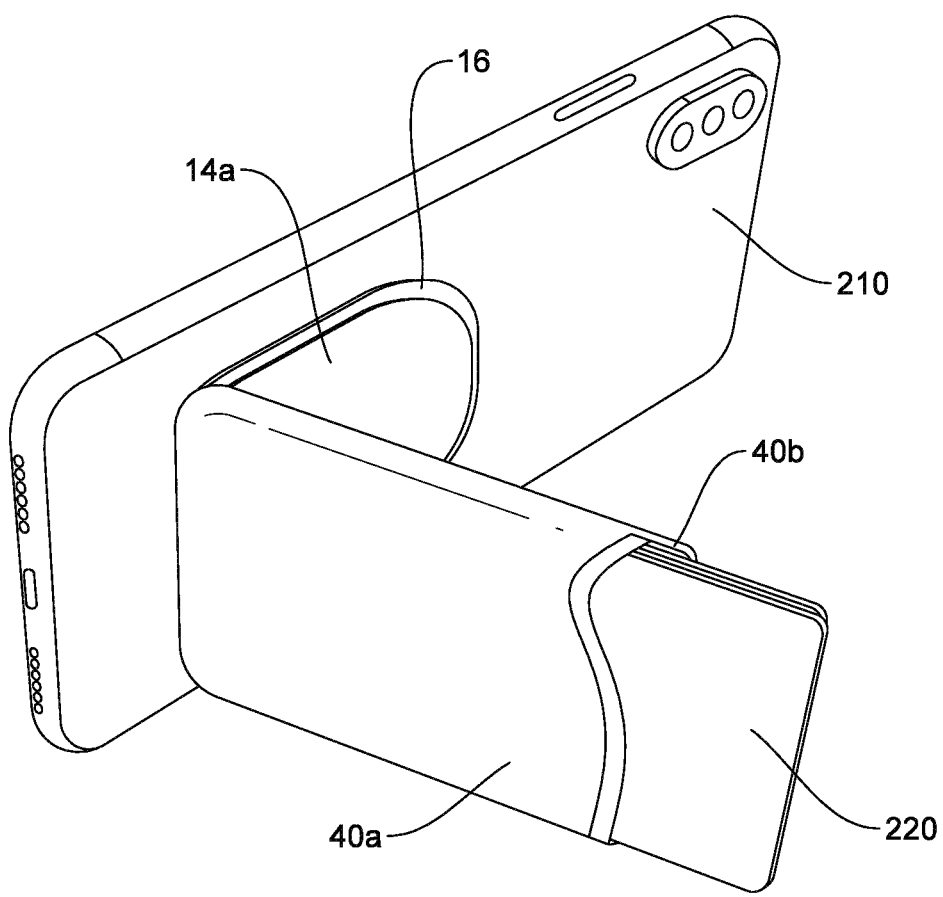
FIG. 16 is a perspective view of the device of FIG. 14 holding the credit cards in a "kickstand" configuration.

FIGS. 7-11 show a variation of the invention with an added elastic band 30 permanently attached to the top-half 10. This elastic band 30 allows the user to grip the phone with one finger as illustrated in FIG. 11. This may assist in decreasing drops of the phone. This may also assist in taking selfies. This variation maintains the "kickstand" ability and the ability to stick the device to any non-porous or semi-porous surface.

FIGS. 12-16 show a variation of the invention with a sleeve 40a and 40b attached to the top-half 10. Credit cards, debit cards, IDs, and other plastic or paper cards or similar items can be place in sleeve for use as a "wallet." This variation maintains the "kickstand" ability and the ability to stick invention to any non-porous or semi-porous surface.

Figure 17:
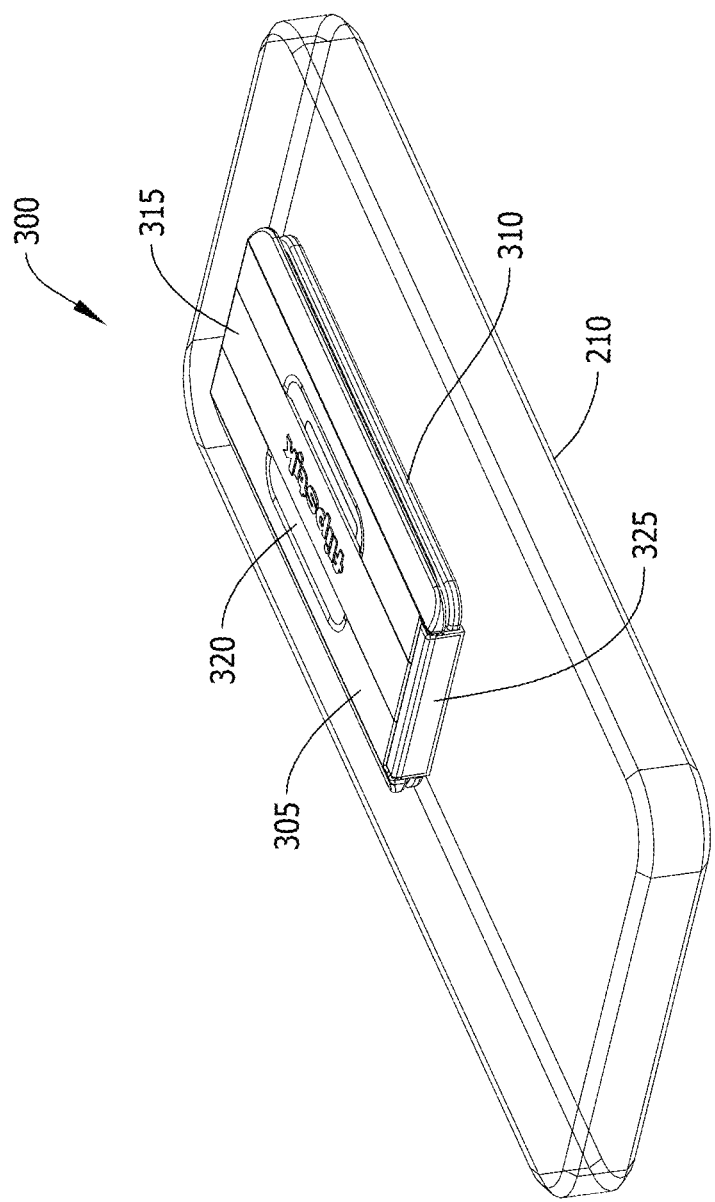
FIG. 17 is a perspective view of an alternate embodiment of the reusable adhesive mount device in an example embodiment of the disclosure.

Turning now to FIG. 17, an alternate embodiment of the reusable adhesive mount device 300 is viewed. In this embodiment, the reusable adhesive mount device 300 may have a different configuration than the design previously disclosed above. The reusable adhesive mount device 300 viewed in FIG. 17 may include a top portion 305 and a bottom portion 310 operatively connected to one another by a hinge 325. Unlike the earlier embodiments, the hinge 325 is not a living hinge but a material piece where in rods connected to the top portion 305 and the bottom portion 310 may be inserted into and secured within the hinge 325. The hinge 325 allows the user of the reusable adhesive mount device 300 the ability to open up the top portion 305 of the reusable adhesive mount device 300 a full 180 degrees so that the top portion 305 and the bottom 310 are in alignment with one another. The hinge 325 itself may be made of a plastic material, a metal material, or any such type of material able to securely connect the rod of the top and bottom portions into the hinge 325. Also present in FIG. 17, a band 315 may circumnavigate the length of the top portion 305. Channels may be formed in the top portion 305 to hold the band 315 in place. The band 315 may be made of elastic material, or silicone material or any type of material that is able to stretch and accommodate a user's finger or fingers to slide under the band 315 and in between the band 315 and the top portion 305 so that the top portion 305 can be lifted by the user. The top portion 305 may include an appendage recess 320 to easily accommodate a user's finger or fingers to be positioned between the band 315 and the top portion 305 of the reusable adhesive mount device 300. A user can slide their finger or fingers into the appendage recess 320 and under the band 315 so that the user can easily open the top portion 305 from the bottom portion 310 of the reusable adhesive mount device 300. Finally, FIG. 17 shows the reusable adhesive mount device 300 attached to a smartphone 210. As previously disclosed, it should be understood that the reusable adhesive mount device 300 can be attached to other electronic devices such as tablet computers, laptops, phones, watches, or any other type of electronic device available for personal use. The bottom portion 310 of the reusable adhesive mount device 300 may be attached to the smartphone 210 by an adhesive patch (not shown). The adhesive patch, or the like, can be used to securely mount and attach the reusable adhesive mount device 300 to the smartphone 210 or personal electronic device.

Figure 18:
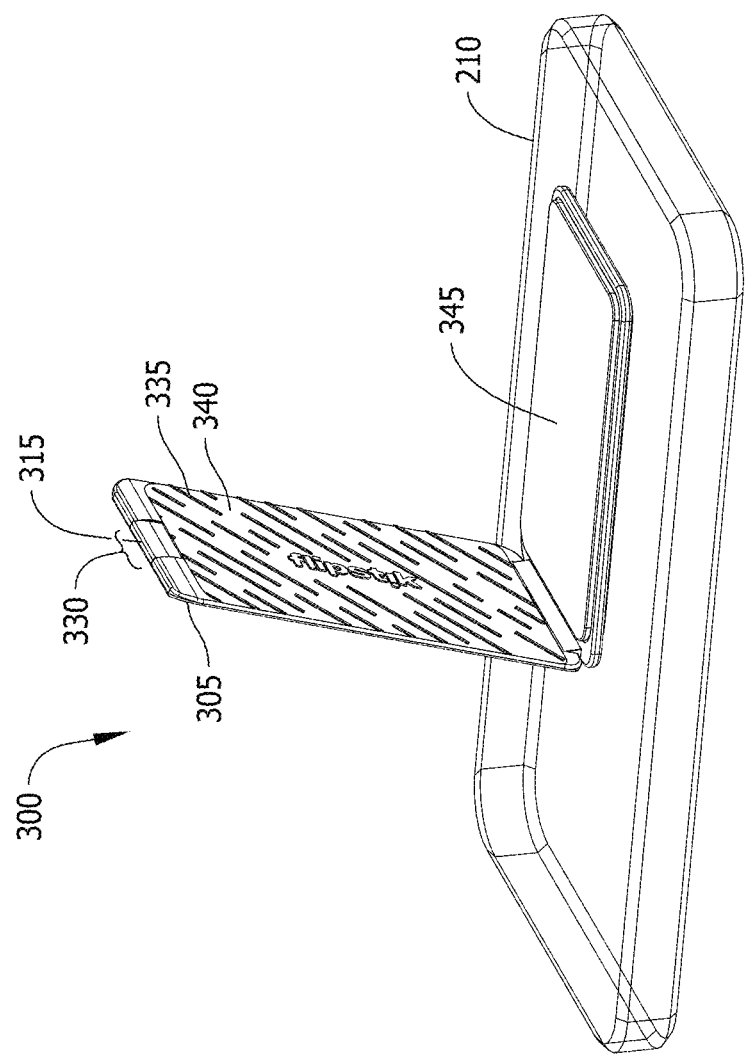
FIG. 18 illustrates the reusable adhesive mount device in a semi-open position in an example embodiment of the disclosure.

FIG. 18 shows the reusable adhesive mount device 300 in a semi-open position. The view shown in FIG. 18 shows the reusable adhesive mount device 300 halfway open and it should be understood that the reusable adhesive mount device 300 can be fully opened so that the top portion 305 and the bottom portion 310 are open a full 180 degrees from one another so that the reusable adhesive mount device 300 can be mounted on any non-porous surface such as leather, mirrors, glass, metal, woods, tile, drywall, human skin and more. The lower face of the bottom portion 310 of the reusable adhesive mount device 300 may contain an adhesive patch (not shown) to securely attach the reusable adhesive mount device 300 to the smartphone 210 or another electronic device. The upper surface of the lower portion 310 may contain a reusable adhesive patch 345. The reusable adhesive patch 345 may be made of synthetic setae or any other type of material that can secure the reusable adhesive mount device 300 to a surface and also be reusable. When the reusable adhesive mount device 300 is in the closed position, the reusable adhesive patch 345 contacts the plate 340 of the top portion 305. In the open position, the reusable adhesive patch 345 can attach to leather, mirrors, glass, metal, woods, tile, drywall, human skin, or the like to secure the reusable adhesive mount device 300 in a hand free position for operation by the user. As stated above, the hinge 325 connects the bottom portion 310 to the top portion 305.

The top portion 305 may be made of two different components which are then fused or operatively attached to one another to form the completed top portion 305. The lower surface of the top portion 305 may be a plate 340 that is attached to the upper surface of the top portion 305. The plate 340 may be shaped to match the shape of the bottom portion 310 facing the top portion 305 that contains the reusable adhesive patch 345. The plate 340 may be made of the same or similar material at the top portion 305. The plate 340 can take many different shapes or embodiments. The plate 340 may have at least one protrusion 335 that extends outward from the surface of the plate 340. As viewed in FIG. 18, a plurality of these protrusions 335 are angled and spaced on the surface of the plate 340. The at least one protrusion 335 creates additional space between the reusable adhesive patch 345 and the top portion 305 of the reusable adhesive mount device 300. The protrusion(s) 335 allow the reusable adhesive patch 345 to maintain breathability, reduce the amount of force needed to open the top portion 305 from the bottom portion 310 due to the reduced surface area in contact between the protrusion(s) 335 and the reusable adhesive patch 345, and reduce the number of debris or material that may inadvertently attach to the reusable adhesive patch 345 during use or storage of the attached electronic device of smartphone 210. In some embodiments, the protrusion may identify the brand or company associated with the reusable adhesive mount device 300. Overall, the protrusion may take multiple different shapes or configurations such as dashed lines, spirals, circles, or any desired shape. The protrusion(s) 335 are all of equal size as they extend from the surface of the plate 340.

Behind the plate 340, the band 315 may be housed and run along the length of the top portion 305. The band 315 having a band width 330 may be centered through the top portion 305 and be made of continuous material construction. Of course, the size and thickness of the band 315 and band width 330 may vary based on the desired design of the manufacturer of the reusable adhesive mount device 300. The plate 340 and the band 315 may form an equal plane when the plate 340 is inserted into and affixed to the top portion. The channels of the top portion 305, shown in further detail in FIGS. 26A and 26B, can allow the band 315 to move as necessary if manipulated by the user.

Figure 19:
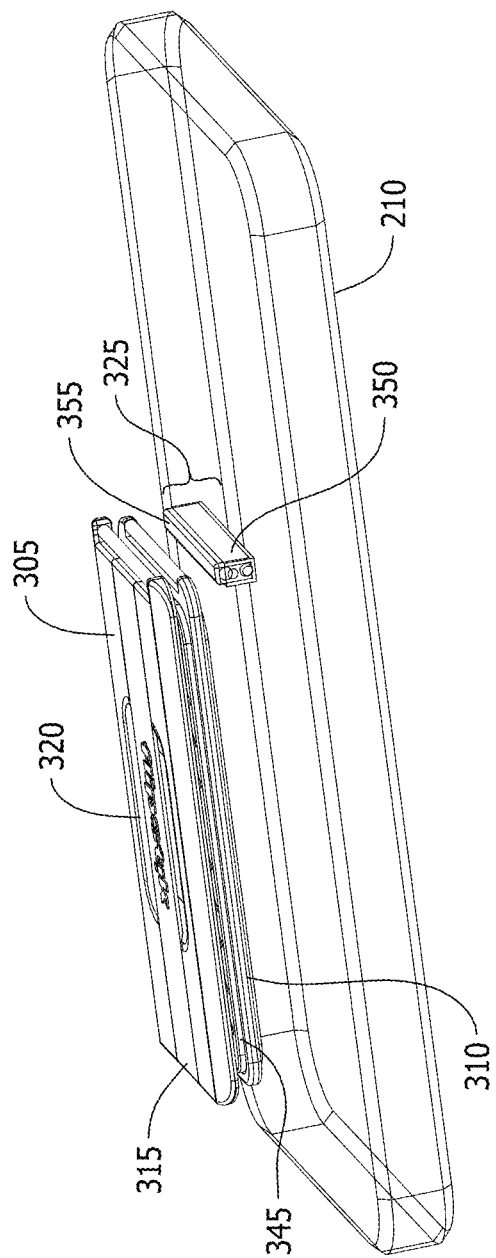
FIG. 19 shows an exploded view of the components of the alternate embodiment of the reusable adhesive mount device in an example embodiment of the disclosure.

FIG. 19 shows an exploded view of the components of the alternate embodiment of the reusable adhesive mount device 300. The components described above are represented in this exploded view. The top portion 305 is viewed about all other components of the reusable adhesive mount device 300. The appendage recess 320 is viewed as a recessed depression into the top surface of the top portion 305. The band 315 is viewed as it circumnavigates the length of the top portion 305. Below the top portion 305, the reusable adhesive patch 345 is shown which can contact the protrusion(s) 335 of the plate 340 on the lower surface of the top portion 305. The reusable adhesive patch 345 can continue to maintain its sticky and attaching nature by being cleaned with soap and water intermediately to remove any possible debris from the surface of the reusable adhesive patch 345. The reusable adhesive patch 345 is attached to the bottom portion 310 of the reusable adhesive mount device 300. While the top surface of the reusable adhesive patch 345 is open to the outside environment for continuous and multiple attachment sessions, the bottom surface of the reusable adhesive patch 345 is securely fixed to the top surface of the bottom portion 310. To attach to the top surface of the bottom portion 310, a strong adhesive layer may be provided on the lower surface of the reusable adhesive patch 345 that securely attaches the reusable adhesive patch 345 to the bottom portion 310. This may occur during manufacture or by the user to replace the reusable adhesive patch 345 if required. The lower surface of the bottom portion 310 can then be securely attached to the smartphone 210 by a strong adhesive layer. The strong adhesive layer may be covered by a film covering in some embodiments. When sold and provided to the user, the user may then remove the film covering of the bottom portion 310 to attach the entire reusable adhesive mount device 300 to the smartphone 210 or personal electronic device.

The hinge 325 is also viewed as expanded in FIG. 19. While the hinge may be a single component in some embodiments, in other embodiments it is made of multiple components. For example, the hinge may be made of two or three different components that may snap fit into each other to secure the top portion 305 and the bottom portion 310 together to create the reusable adhesive mount device 300. In this multiple component design, a combination of snap fit links may be used to create the hinge 325. A first link 350 may be used that can attach and hold the rods of each the top portion 305 and the bottom portion 310 of the reusable adhesive mount device 300. The first link 350 may have an H shape or wherein each of the rods of the top portion 305 and the bottom portion 310 can fit into the open holes of the link. In other embodiments, the lower portion of the first link 350 having a H shaped design may be closed and already attached to be part of the bottom portion 310. To finalize securing the top portion 305 and the bottom portion 310 to the hinge 325, a second link 355 may be used. The second link 355 may have a U-shaped design. The second link 355 can then snap fit around the rod of either the top portion 305 or the bottom portion 310 and snap into the first link 350. Mating the first link 350 with the second link 355 creates the hinge 325. Depending on the desired configuration of the reusable adhesive mount device 300, one or two second links 355 may be used in the completed design of the hinge 325.

Figure 20:
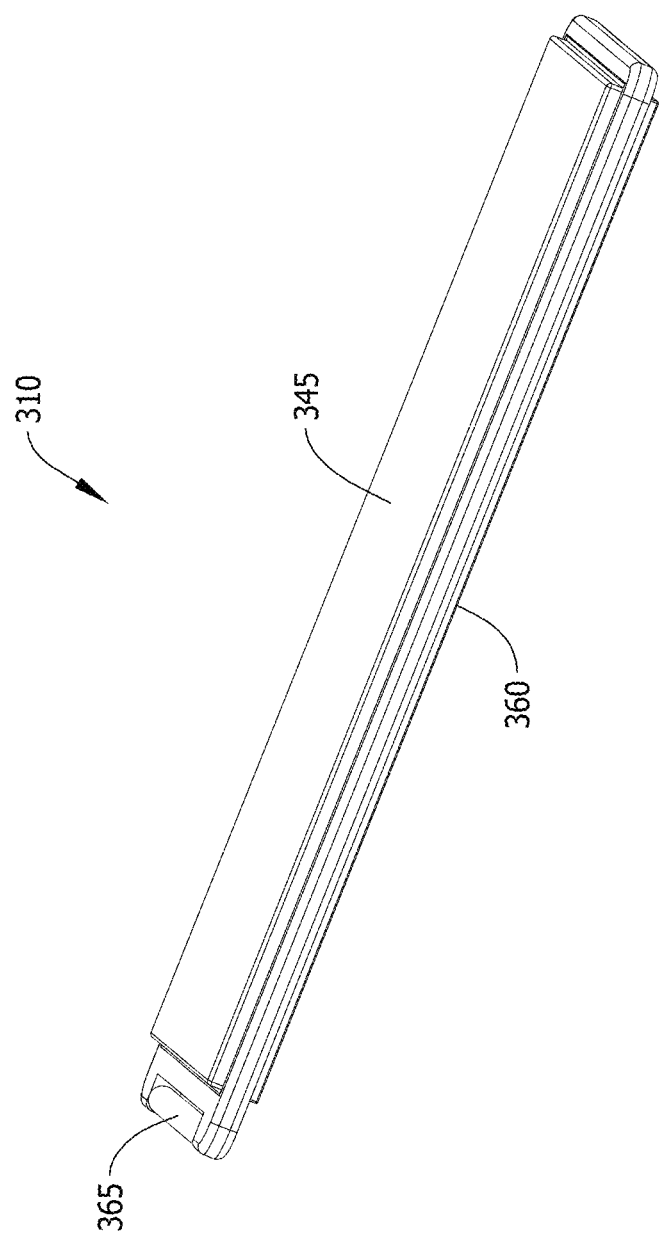
FIG. 20 illustrates an image of the bottom portion of the reusable adhesive mount device in an example embodiment of the disclosure.

Now viewing FIG. 20, an image of the bottom portion 310 of the reusable adhesive mount device 300 is seen. FIG. 20 shows both the top surface and the bottom surface of the bottom portion 310. The top surface of the bottom portion 310 consists of the reusable adhesive patch 345 as described above. The bottom surface of the bottom portion includes an adhesive layer 360. The adhesive layer 360 is a stronger bond than the reusable adhesive patch 345 and not intended to be used in a reusable manner. The adhesive layer 360 may be covered by a film (not shown) to protect the adhesive until it is ready for use and attachment to the smartphone 210. As one end of the bottom portion 310 a tab extension of the bottom portion material is present. At the opposite end of the bottom portion 310 the bottom portion rod 365 is present. The bottom portion rod 365 creates spacing between the rod and the rest of the bottom portion 310. The hinge 325, and either the first link 350 and second link 355, can encompass and enclose the bottom portion rod 365 so that the hinge may rotate about the rod when the bottom portion 310 is attached to the smartphone 210 or another personal electronic device or object.

Figure 21:
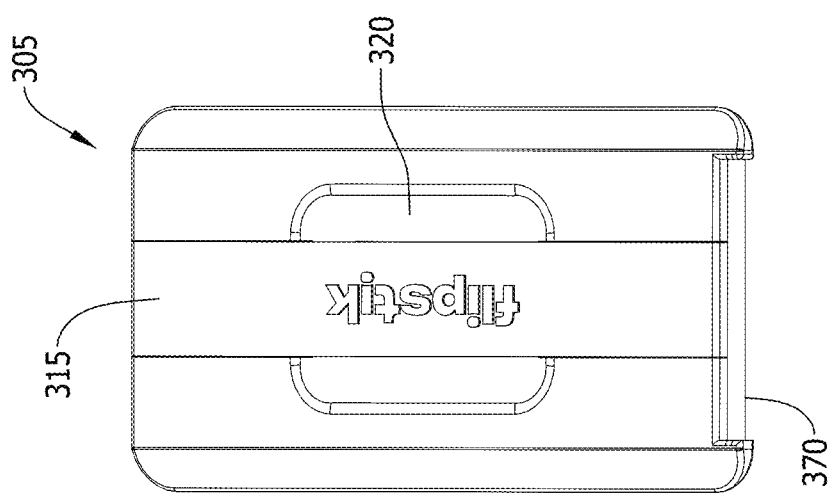
FIG. 21 illustrates the top surface of the top portion of the reusable adhesive mount device in an example embodiment of the disclosure.

FIG. 21 shows the top surface of the top portion 305 of the reusable adhesive mount device 300. As discussed above, the top surface of the top portion 305 of the reusable adhesive mount device 300 has an appendage recess 320 that is depressed below the surface of the top portion 305. The appendage recess 320 is configured to allow a user of the reusable adhesive mount device 300 the ability to easily place a finger or multiple fingers underneath the band 315 of the reusable adhesive mount device 300. The band 315 as discussed above has a band width and can circumnavigate the length of the top portion 305 and is housed within the top portion channels. While the band 315 is accessible at one end of the top portion 305, the other end of the top portion 305 has a top portion rod 370. The top portion rod 370 creates spacing between the rod and the rest of the top portion 305 near the band 315. The hinge 325, and either the first link 350 and/or second link 355, can encompass and enclose the top portion rod 365 so that the hinge may rotate about the rod when the bottom portion 310 is attached to the smartphone 210 and the top portion 305 is manipulated into the open position of the reusable adhesive mount device 300. The opposite surface of the top portion 305 which is not shown but described in the earlier figures contains the plate 340.

Figure 22:
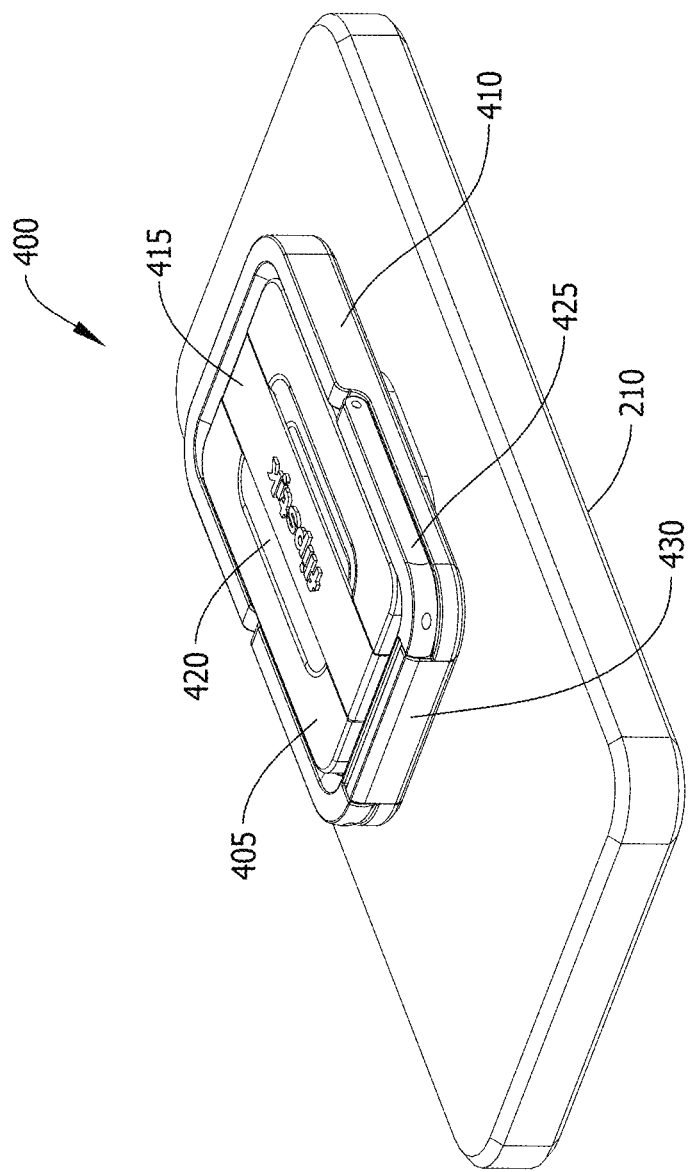
FIG. 22 illustrates shows another alternative embodiment of the reusable adhesive mount device in an example embodiment of the disclosure.

FIG. 22 shows another alternative embodiment of the reusable adhesive mount device 400. In this example embodiment, the reusable adhesive mount device 400 is not only movable from a closed position to an open position 180 degrees from the closed position, the reusable adhesive mount device 400 is also rotatable 360 degrees. Furthermore, the reusable adhesive mount device 400 is tiltable to adjust the angle to which the smartphone 210 or personal electronic device may be viewed based on orientation of the user using the smartphone with the reusable adhesive mount device 400. The reusable adhesive mount device 400 viewed in FIG. 22 is shown in the closed position and attached to a smartphone 210. The reusable adhesive mount device 400 has both a top portion 405 and a bottom portion 410. The top portion 405 may have an appendage recess 420 generally located in the middle of the top surface of the top portion 405. In some embodiments, the appendage recess 420 may be staged in levels as it descends into and below the top surface of the top portion 405. The appendage recess 420 allows a user's finger or fingers to slip under and in between the top portion and the band 415 that circumnavigated the length of the top portion. The band 415 is also present on the top portion. The band 415 is housed within an indented band channel of the top portion 405 of the reusable adhesive mount device 400. The band 415 can be any type of elastic material such as rubber, silicone, or other flexible material. That band 415 may be made as a single continuous component, but in other instances it could be stitched or sealed together to create the band 415. The band 415 within the band channel can allow the band 415 and the top portion 405 to be on the same plane so that an extended band 415 cannot catch or disturb the use of the other components of the reusable adhesive mount device 400.

Different in relation to the other embodiments, the top portion 405 of the reusable adhesive mount device 400 is seated within the bottom portion 410 of the reusable adhesive mount device 400. The bottom portion 410 does not have one continuous height. A first end of the bottom portion 410 is lower than the opposite end of the bottom portion. In the general center of the bottom portion 410 at the edges, the height of the bottom portion increases to the second higher height. In the closed position of the reusable adhesive mount device 400, the top portion 305 fits within the bottom portion 410 and the second height of the edges of the bottom portion 410 is on generally the same plane as the top portion 405 when the reusable adhesive mount device 400 is in the closed position. The bottom portion 410 of the reusable adhesive mount device 400 may be attached directly to the smartphone 210 or other personal electronic device in some embodiments. In this type of embodiment, an adhesive layer, such as adhesive layer 360, may be located on the bottom surface of the bottom portion 410. A film may cover the adhesive layer until it is removed and ready to be mounted on the smartphone 210. The adhesive layer is a strong secure bond between the bottom portion 410 and the smartphone 210 so that the reusable adhesive mount device 400 cannot be removed easily from the smartphone 210. The adhesive layer is not intended to be a reusable adhesive. In other embodiments, the bottom surface of the bottom portion 410 can connect to a secondary component that is attached to the smartphone 210 or another electronic device. In this type of configuration, the bottom portion 410 of the reusable adhesive mount device 400 is rotatable 360 degrees so that the reusable adhesive mount device 400 or the attached smartphone 210 can rotate if desired by the user.

In the embodiment viewed in FIG. 22, a plurality of hinges are used to connect the bottom portion 410 to the top portion 405 of the reusable adhesive mount device 400. A first hinge 430 can connect the bottom portion 410 to a second hinge 425. A pair of pins or rods may facilitate the connection. The second hinge 425 can then connect to the top portion 405 through a pair of pins or rods. The use of a first hinge 430 and a second hinge 425 allows the reusable adhesive mount device 400 to drastically increase the movability of the smartphone 210 to easily accommodate the location and desires of the user. The first hinge 430 allows the user of the reusable adhesive mount device 300 the ability to open up the top portion 405 of the reusable adhesive mount device 400, through the aid of the second hinge 425, a full 180 degrees so that the top portion 405 and the bottom portion 410 are in alignment with one another. The first hinge 430 itself may be made of a plastic material, a metal material, or any such type of material able to securely connect the rod and/or pins of the bottom portion 410 and second hinge 425 into the first hinge 430. The second hinge 425 is attached to the first hinge 430 at one end and at the other end attached to the top portion 405. The second hinge 425 may be made of a single unitary piece or can be a combination of two different pieces of material that create a U-shaped hinge. The second hinge 425 can attach to the top portion 405 in approximately the middle area of the top portion 405. When the reusable adhesive mount device 400 is in the closed position, the second hinge may rest on top of the bottom portion 410 of the reusable adhesive mount device 400 and create a common planar surface with the top portion 405. The second hinge 425 fits onto the top surface of the edge's bottom portion 410 in the area of the bottom portion 410 where the height of the bottom portion 410 is lower than the remainder of the bottom portion 410. When the top portion 405 is lifted, the second hinge 425 moves upward with the top portion 405 as it pivots upon its mounting pins connected to each the top portion 405 and the first hinge 430. The second hinge 425 allows the user of the reusable adhesive mount device 400 the ability to open up the top portion 405 of the reusable adhesive mount device 400 a full 180 degrees so that the top portion 405 and the bottom 410 are in alignment with one another. The second hinge 425 also allows the user of the reusable adhesive mount device 400 the ability to tilt the viewing angle of the smartphone 210 or personal electronic device based on the position of the reusable adhesive mount device 400 mounted on the outside mounting surface. The second hinge 425 itself may be made of a plastic material, a metal material, or any such type of material able to securely connect via rods or pins the second hinge 425 to each the top portion 405 and the first hinge 430.

Figure 23:
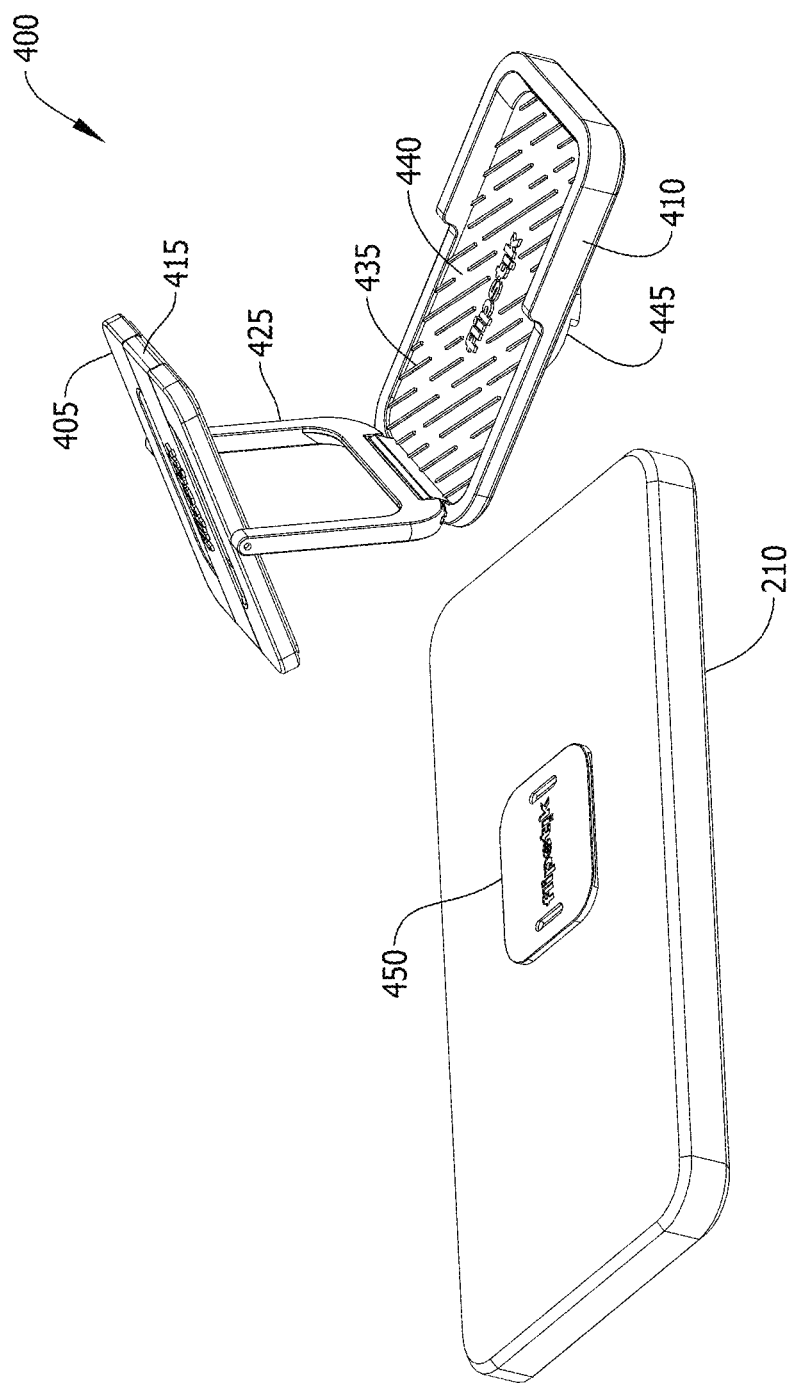
FIG. 23 illustrates the reusable adhesive mount device in an open position and detached from a personal electronic apparatus in an example embodiment of the disclosure.

FIG. 23 shows the reusable adhesive mount device 400 in an open position and detached from the smartphone 210. While the reusable adhesive mount device 400 may be securely attached and affixed to the smartphone 210 by an adhesive layer (not shown), the view illustrated in FIG. 23 shows the reusable adhesive mount device 400 able to be detachably removable from a mounting plate 450 that is secured to the smartphone 210 or personal electronic device. In this open detached position, additional components of the reusable adhesive mount device 400 are viewable. On the smartphone 210, a mounting plate 450 is present. The mounting plate 450 may have a top surface and a bottom surface. The top surface of the mounting plate 450 allows the reusable adhesive mount device 400 to be securely attached to the smartphone 210 by way of extended track slots on the edges of the mounting plate 450. The bottom surface of the mounting plate 450 can directly attach to the smartphone by way of an adhesive layer (not shown). The adhesive layer is a strong adhesive substance that is not intended to be reusable. The adhesive layer will secure the mounting plate 450 to the smartphone 210 so that the reusable adhesive mount device 400 itself can attach and detach from the smartphone 210 depending on the desired use of the user.

In FIG. 23, the reusable adhesive mount device 400 is viewed detached from the mounting plate 450 and the smartphone 210 or another personal electronic device. The reusable adhesive mount device 400 is viewed in an open configuration where when the reusable adhesive mount device 400 is connected to the smartphone 210 the reusable adhesive mount device 400 can be mounted on nearly any non-porous or semi-porous flat surface including leather, mirrors, glass, metal, woods, tile, drywall, human skin and more. The top portion 405 is viewed having a band 415. The band 415 may accommodate a user's finger or fingers to slide under the band 415 and in between the band 415 and the top portion 405 so that that top portion 405 can be removed from the closed position of the reusable adhesive mount device 400 and be extended away from the bottom portion 410. The band 415 can circumnavigate the length of the top portion 405 and is held within the top portion 405 by a band channel depression. The top portion 405 is attached to the second hinge 425 in generally the center area of the top portion 405. The second hinge 425 attaches to the top portion via a pair of pins, rods, or fasteners connecting the second hinge 425 to the outside edges of the top portion 405. The second hinge 425 allows the top portion 405 to be totally rotatable in 360 degrees and allows the top portion 405 to be flappable. The top portion 405, unlike earlier embodiments, contains the reusable adhesive patch (seen in FIG. 24) on the bottom surface of the top portion 405. Thus, in operational use, the bottom surface of the top portion 405 is the part of the reusable adhesive mount device 400 which attaches to any non-porous or semi-porous flat surface including leather, mirrors, glass, metal, woods, tile, drywall, human skin, or the like.

The second hinge 425 is connected to the first hinge 430 thereby making the top portion 405 operatively connected to the bottom portion 410. The bottom portion 410 of the reusable adhesive mount device 400 embodiment contains a bit of a different configuration when compared to the bottom portion of other embodiments disclosed above. The bottom portion 410 may have a bottom portion top surface 440. The bottom portion top surface 440 may be shaped to match the shape of the bottom surface of the top portion 405 which contains the reusable adhesive patch so that in the closed position the reusable adhesive patch will rest and mate with the bottom portion top surface 440. The bottom portion top surface 440 may have at least one protrusion 435 that extends outward from the bottom portion top surface 440 in an upward direction. As viewed in FIG. 23, a plurality of these protrusions 435 are viewed as angled and spaced on the bottom portion top surface 440. The at least one protrusion 435 creates additional space between the reusable adhesive patch and the bottom portion 410 of the reusable adhesive mount device 400. The protrusion(s) 435 allow the reusable adhesive patch to maintain breathability, reduce the amount of force needed to open the top portion 405 from the bottom portion 410 due to the reduced surface area in contact between the protrusion(s) 435 and the reusable adhesive patch, and reduce the number of debris or material that may inadvertently attach to the reusable adhesive patch during use or storage of the attached electronic device of smartphone 210. In some embodiments, the protrusion may identify the brand or company associated with the reusable adhesive mount device 400. Overall, the protrusion may take multiple different shapes or configurations such as dashed lines, spirals, circles, or any desired shape. The protrusion(s) 435 are all of equal size as they extend from the surface of the bottom portion top surface 440.

The edges of the bottom portion 410 are of two different heights. One end of the edges of the bottom portion 410 has a first height which is lower than the opposite end of the edges of the bottom portion 410 which has a second height. The edges of the entire bottom portion 410 are higher than the bottom portion top surface 440. The second hinge 425 may mate with the edges of the bottom portion 410 at the lower height end of the bottom portion 410 edges in the closed configuration. In the closed configuration of reusable adhesive mount device 400, the second hinge 425 and the upper height of the edges of the bottom portion 410 may form a generally flat common plane with each other and the top portion 405 of the reusable adhesive mount device 400. On the bottom surface of the bottom portion 410 a spinner 445 may be present. The spinner may be square shaped, disc shaped, or any other possible shape so long as the spinner 445 can achieve its operational use. The spinner 445 is a separate component that connects to the bottom portion 410 of the reusable adhesive mount device 400. The spinner 445 allows the bottom portion 410 and the entire reusable adhesive mount device 400 when mounted on the smartphone 210 or personal electronic device the ability to rotate a full 360 degrees in both a clockwise and a counterclockwise direction. When the reusable adhesive mount device 400 is mounted to the smartphone 210 or personal electronic device and the reusable adhesive mount device 400 is mounted to a non-porous or semi-porous surface by way of the reusable adhesive patch, the reusable adhesive mount device 400 may be rotated by the spinner 445 to a desired orientation by the user. The spinner 445 will then keep the desired orientation due to the slight amount of friction between the spinner 445 and parts of the bottom surface of the bottom portion 410 of the reusable adhesive mount device 400.

Figure 24:
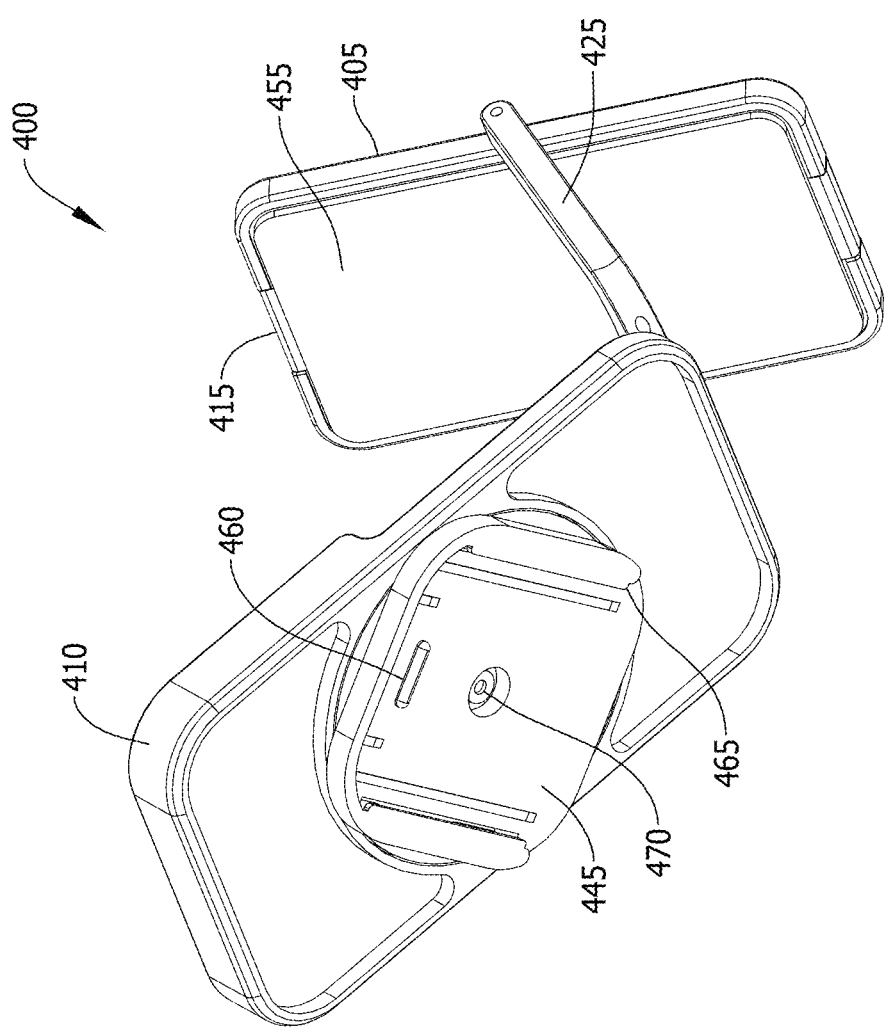
FIG. 24 illustrates an alternate view of the reusable adhesive mount device i in the open position and not connected to a personal electronic apparatus in an example embodiment of the disclosure.

Turning now to FIG. 24, an alternate view of the reusable adhesive mount device 400 is illustrated in the open position and not connected to a smartphone 210 or personal electronic device. The top portion 405 is viewed attached to the second hinge 425 by way of pins, rods, or any other possible type of fastener which allows rotation of the top portion 405. The second hinge 425 connects to the top portion 405 in generally the middle area of the side edges of the top portion 405 and allows the top portion 405 to be fully rotatable and flippable. The second hinge as seen in FIG. 24 and earlier figures may have a U-shaped design and may be an articulating arm. The top portion 405 also has a band 415 that is housed within band channels depressed into the top portion 405 and allows the band 415 to circumnavigate the length of the top portion 405. On the bottom surface of the top portion 405, a reusable adhesive patch 455 may be present. The reusable adhesive patch 455 may be made of synthetic setae or any other type of material that can secure the reusable adhesive mount device 400 to a surface and also be reusable. When the reusable adhesive mount device 400 is in the closed position, the reusable adhesive patch 455 contacts the bottom portion top surface 440 of the bottom portion 410 and mainly the least one protrusion 435 that extends outward from the bottom portion top surface 440 in an upward direction. In the open position, the reusable adhesive patch 455 can attach to any non-porous or semi-porous surface such as leather, mirrors, glass, metal, woods, tile, drywall, human skin, or the like to secure the reusable adhesive mount device 400 in a hand free position for operation by the user.

FIG. 24 also illustrates the bottom surface of the bottom portion 410 of the reusable adhesive mount device 400. The spinner 445 is viewed attached to the bottom surface of the bottom portion 410. The spinner 445 may be attached to the bottom surface of the bottom portion 410 by way of bottom surface pin 470. The bottom surface pin 470 may be a plastic component that protrudes outward from the bottom surface. The bottom surface pin 470 may be circular in design so that the spinner 445, when attached, can easily rotate around the central axis of the bottom surface pin 470. The bottom surface pin 470 may be a snap fit design so that the spinner 445 having an opening can be pressed onto and through the bottom surface pin 470 so that it extends beyond the surface of the spinner 445 and allows the spinner 445 to freely rotate.

The spinner 445 may also have a plurality of track slots 465. A first track slot 465 may oppose a second track slot so that the mounting plate 450 may fit into the spinner 445 by way of the plurality of track slots 465. The spinner 445 may have a generally square design as viewed in FIG. 24, but other configurations such as circles may be possible. To secure the spinner 445 to the mounting plate 450, a locking tab 460 may be present on the lower surface of the spinner. The locking tab 460 may be a ridge or bulge on the lower surface of the spinner 445 that extends upwards away from the surface. When attached to the mounting plate 450, the locking tab 460 may interlock with a recess provided on the mounting plate 450. The snap fit design of the locking tab 460 and locking recess of the mounting plate may provide a secure connect between the spinner 445 and the mounting plate 450 such and normal daily operation of the smartphone 210 or personal electronic device with the attached reusable adhesive mount device 400 will not cause the spinner 445 to be dismounted or removed from the mounting plate 450. The force of attachment between the locking tab 460 and the locking recess should also be sufficient to support the reusable adhesive mount device 400 when it is attached to a non-porous or semi-porous material by way of the reusable adhesive patch 455. Furthermore, the locking tab 460 may be removed from the locking recess when sufficient force is supplied in the proper direction so that the locking tab 460 is dislodged from the recess. This will allow the user to continuously attach and detach the reusable adhesive mount device 400 via the spinner to the mounting plate 450 located on the smartphone 210.

Figure 25:
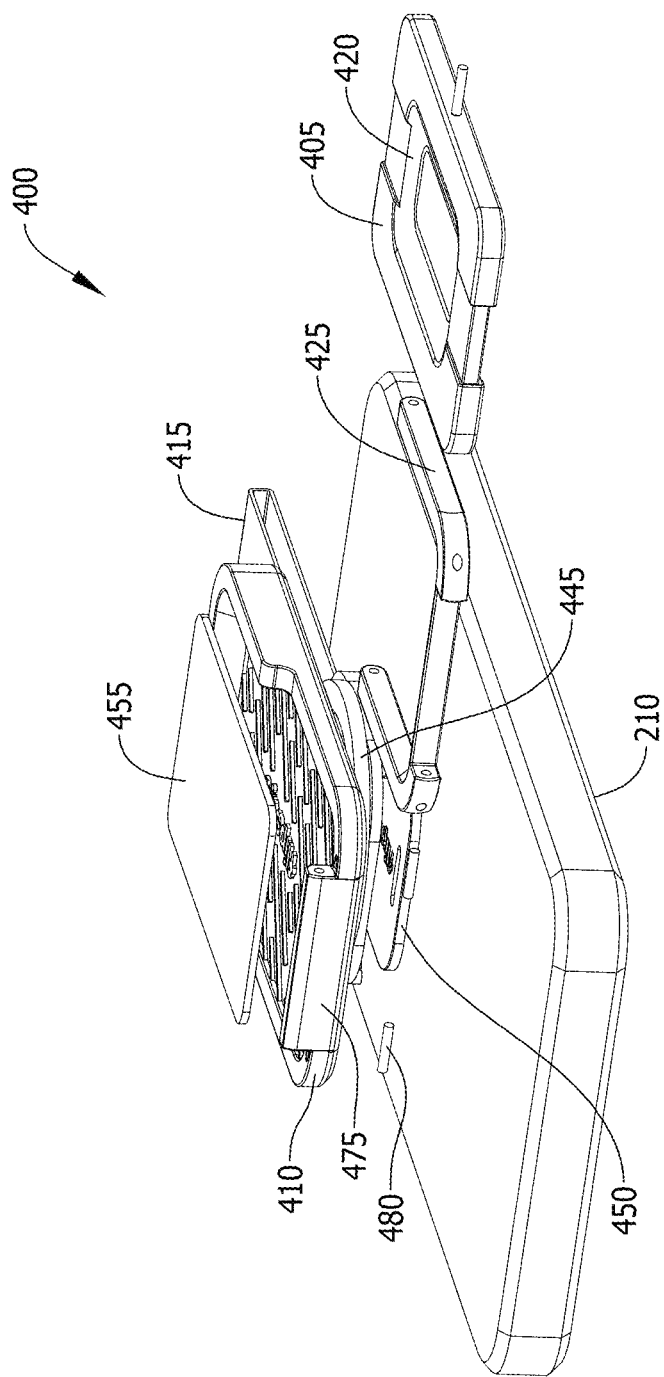
FIG. 25 illustrates an exploded view of the components associated with the reusable adhesive mount device in an example embodiment of the disclosure.

FIG. 25 illustrates an exploded view of the components associated with the reusable adhesive mount device 400. The components viewed in FIG. 25 are viewed as removed from one another and may be viewed in positions not relative to their actual positions within the fully assembled reusable adhesive mount device 400. The reusable adhesive patch 455 is viewed in FIG. 25. As stated above, the reusable adhesive patch 455 may connect to the bottom surface of the top portion 405 through a secure adhesive layer that is not intended to be removable. The outward facing surface of the reusable adhesive patch 455 is intended to be reusable and may attach to any non-porous or semi-porous surface to secure the reusable adhesive mount device 400 for hands free user operation. The top portion 405 is also viewed in FIG. 25. The top portion 405 contains an appendage recess 420 that is layered and depressed into the top surface of the top portion 405. The top portion also has a band channel depressed into the surface of both the top and bottom surfaces of the top portion 405 to fit band 415. The second hinge 425 is viewed as an articulating arm and can connect the top portion 405 to the bottom portion 410 of the reusable adhesive mount device 400. Pins 480, fastener, rods, or the like can be used to facilitate the connection of the second hinge 425 to the edges of the top portion 405. The second hinge 425 can also connect to a first hinge 430 in some embodiments. In the embodiment viewed in FIG. 25, the first hinge 430 is a hinged extension 475 raised upward from the surface of the bottom portion 410 at one end of the bottom portion 410. The hinged extension 475 may be made of and be part of the same material of the bottom portion 410. The top part of the hinged extension 475 is a semicircular design allowing the second hinge 425 to be able to rotate about the hinged extension 470. Pins 480, rods, or fasteners or the like can achieve the operative connection between the hinged extension 470 and the second hinge 425. FIG. 25 also shows the spinner 445 that is connected to the bottom surface of the bottom portion 410. The spinner 445 may be able to be attachable to the mounting plate 450. The mounting plate 450 can be attached and secured to smartphone 210 or any other personal electronic device via an adhesive layer that is not intended to be detachable. The components viewed in FIG. 25 operate as disclosed and described above and through the present application.

Figure 26B:
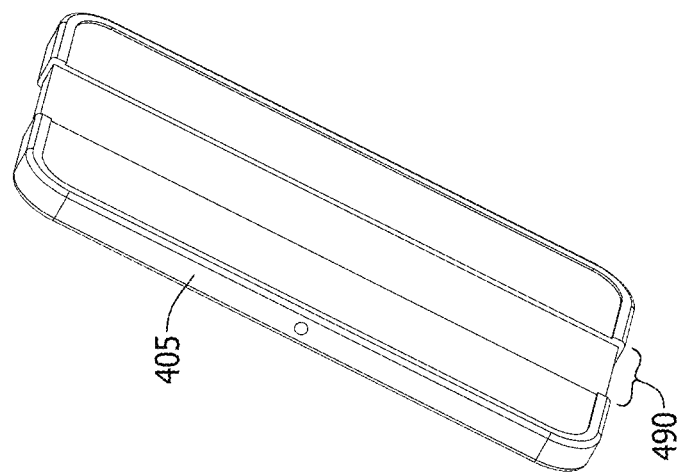
FIG. 26B illustrates a bottom surface of the top portion of the reusable adhesive mount device in an example embodiment of the disclosure.
Figure 26A:
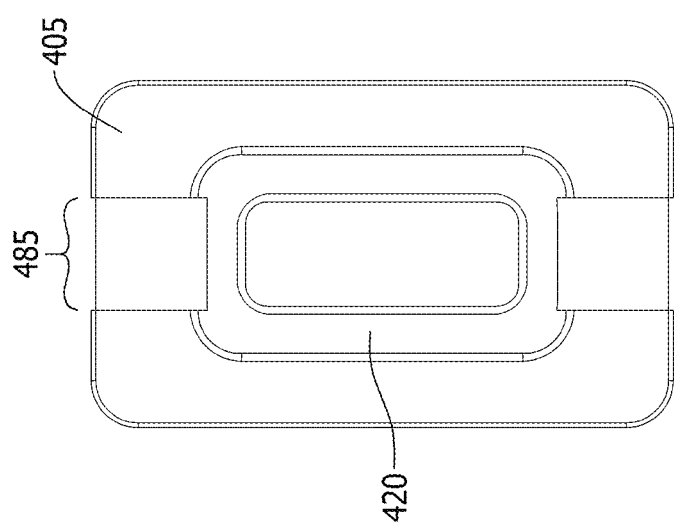
FIG. 26A illustrates a top surface of the top portion of the reusable adhesive mount device in an example embodiment of the disclosure.

Turning now to FIGS. 26A and 26B the top portion 405 of the reusable adhesive mount device 400 is viewed. The top portion 405 as described above has an appendage recess 420 that allows a user's fingers to easily slide between the band 415 and the top surface of the top portion to open the reusable adhesive mount device 400 into the open position. The top surface of the top portion 405 may have a front band channel 485. The front band channel 485 may extend from each end of the top portion 405 until the appendage recess 420. The front band channel 485 is a shallow indentation into the top surface and the edges of the top portion 405 configured to accommodate and house the band 415. When the band 415 is located within the front band channel 485, the band 415 and the top surface of the top portion 405 may form a generally consistent plane between the two components. As seen in FIG. 26B, the back surface of the top portion 405 contains a back band channel 490. The back band channel 490 may extend continuously from each end of the top portion 405. The back band channel 490 is a shallow indentation into the back surface and the edges of the top portion 405 configured to accommodate and house the band 415. When the band 415 is located within the back band channel 490, the band 415 and the back surface of the top portion 405 may form a generally consistent plane between the two components. As stated above, in the disclosed embodiment of the reusable adhesive mount device 400, the reusable adhesive patch 455 attached to the back surface of the top portion 405 and in turn the part of band 415 that lies within the back band channel 490. This attachment helps secure band 415 in place within each the front band channel 485 and back band channel 490 during operational use of the reusable adhesive mount device 400.

Figure 27A:
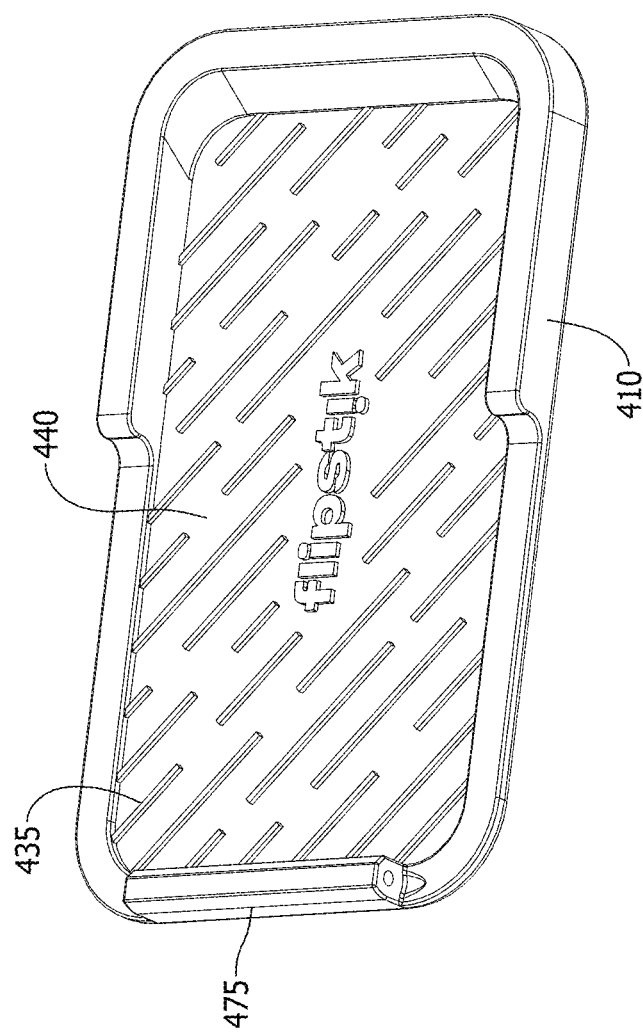
FIG. 27A illustrates a top surface of the bottom portion of the reusable adhesive mount device in an example embodiment of the disclosure.
Figure 27B:
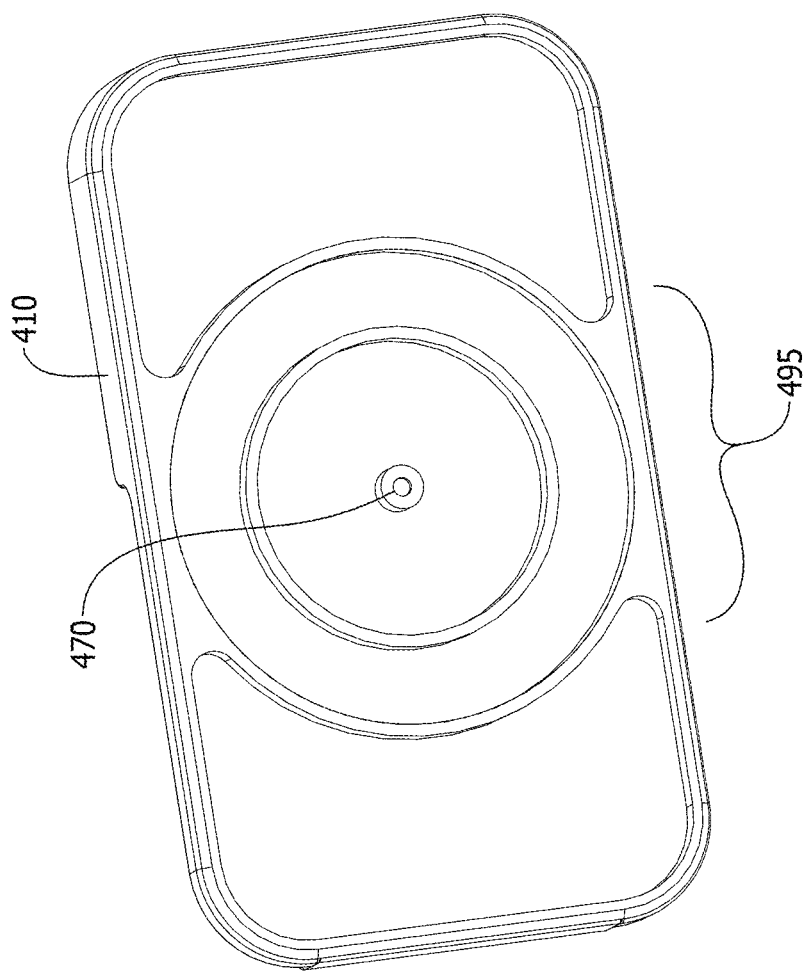
FIG. 27B illustrates a bottom surface of the bottom portion of the reusable adhesive mount device in an example embodiment of the disclosure.

FIGS. 27A and 27B show the bottom portion 410 of an embodiment of the reusable adhesive mount device 400. In FIG. 27A, the bottom portion top surface 440 may be shaped to match the shape of the bottom surface of the top portion 405 which contains the reusable adhesive patch 455 so that in the closed position the reusable adhesive patch 455 will rest and mate with the bottom portion top surface 440. The bottom portion top surface 440 may have at least one protrusion 435 that extends outward from the bottom portion top surface 440 in an upward direction. As viewed in FIG. 27A, a plurality of these protrusions 435 are viewed as angled lines and spaced on the bottom portion top surface 440. The at least one protrusion 435 creates additional space between the reusable adhesive patch 455 and the bottom portion 410 of the reusable adhesive mount device 400. The protrusion(s) 435 allow the reusable adhesive patch 455 to maintain breathability, reduce the amount of force needed to open the top portion 405 from the bottom portion 410 due to the reduced surface area in contact between the protrusion(s) 435 and the reusable adhesive patch 455, and reduce the number of debris or material that may inadvertently attach to the reusable adhesive patch 455 during use or storage of the attached electronic device of smartphone 210. In some embodiments, the protrusion 435 may identify the brand or company associated with the reusable adhesive mount device 400. Overall, the protrusion 435 may take multiple different shapes or configurations such as dashed lines, spirals, circles, or any desired shape. The protrusion(s) 435 are all of equal size as they extend from the surface of the bottom portion top surface 440. At one end of the bottom portion, the hinged extension 475 is viewed. The hinged extension 475 may act as the first hinge 430 is some embodiments of the reusable adhesive mount device 400. Pins 480, rods, or fasteners or the like can attach the hinge extension 475 to the second hinge 425 to create the reusable adhesive mount device 400. FIG. 27B shows the back surface of the bottom portion 410. In some embodiments, the back surface of the bottom portion 410 may contain an adhesive layer. The adhesive layer may be protected by a film which can then be removed when the user wishes to attach the reusable adhesive mount device 400 to a smartphone 210 or personal electronic device. In this configuration where the back surface of the bottom portion 410 contains an adhesive layer, the reusable adhesive mount device 400 will not be rotatable. In the embodiment shown in FIG. 27B, the back surface of the bottom portion 410 is viewed wherein the reusable adhesive mount device 400 is to be rotatable. The spinner 445 may be attached to the back surface of the bottom portion 410 by way of bottom surface pin 470. The bottom surface pin 470 may be a plastic component that protrudes outward from the back surface. The bottom surface pin 470 may be circular in design so that the spinner 445, when attached, can easily rotate around the central axis of the bottom surface pin 470. The bottom surface pin 470 may be a snap fit design so that the spinner 445 having an opening can be pressed onto and through the bottom surface pin 470 so that it extends beyond the surface of the spinner 445 and allows the spinner 445 to freely rotate. To help the spinner 445 rotate and to secure the spinner 445 to the bottom portion 410, the back surface may contain a spinner guide 490. The spinner guide may be an area on the back surface of the bottom portion 410 where the spinner 445 can rotate within the spinner guide 490 area. The spinner guide 490 may also have ridges that protrude outward from the back surface of the bottom portion 410. Corresponding grooves located on the spinner 445 may fit within the ridges of the spinner guide 490. The spinner guide 490 helps position the spinner 445 as the reusable adhesive mount device 400 is rotated. Friction between the spinner 445 and the spinner guide 490 helps secure the reusable adhesive mount device 400 in the desired orientation of the user when the reusable adhesive mount device 400 is mounted to a non-porous or semi-porous surface.

Figure 28:
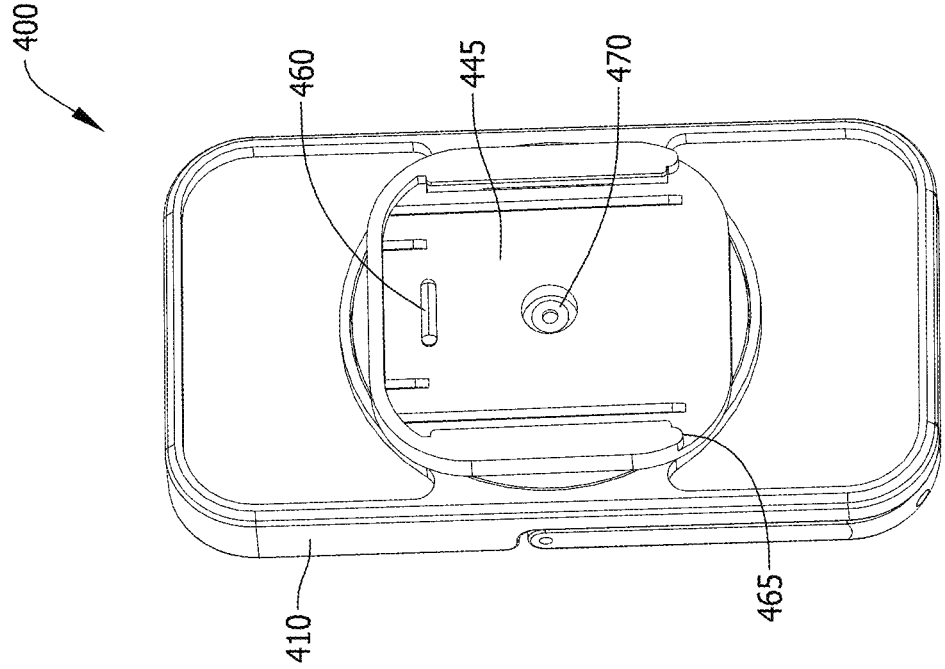
FIG. 28 illustrates back surface of the bottom portion of the reusable adhesive mount device with a spinner attached in an example embodiment of the disclosure.

FIG. 28 shows the back surface of the bottom portion 410 of the reusable adhesive mount device 400 with the spinner 445 attached. The spinner may be square shaped, disc shaped, or other possible envisioned shapes so long as the spinner 445 can achieve its operational use goal. The spinner 445 allows the bottom portion 410 and the entire reusable adhesive mount device 400 when mounted on the smartphone 210 or personal electronic device the ability to rotate a full 360 degrees in both a clockwise and a counterclockwise direction. When the reusable adhesive mount device 400 is mounted to the smartphone 210 or personal electronic device and the reusable adhesive mount device 400 is mounted to a non-porous or semi-porous surface by way of the reusable adhesive patch 455, the reusable adhesive mount device 400 may be rotated by the spinner 445 to a desired orientation by the user. The spinner 445 will then keep the desired orientation due to the slight amount of friction between the spinner 445 and parts of the bottom surface of the bottom portion 410 of the reusable adhesive mount device 400.

The spinner 445 may be attached to the bottom surface of the bottom portion 410 by way of bottom surface pin 470. The bottom surface pin 470 may be a plastic component that protrudes outward from the bottom surface. The bottom surface pin 470 may be circular in design so that the spinner 445, when attached, can easily rotate around the central axis of the bottom surface pin 470. The bottom surface pin 470 may be a snap fit design so that the spinner 445 having an opening can be pressed onto and through the bottom surface pin 470 so that it extends beyond the surface of the spinner 445 and allows the spinner 445 to freely rotate.

The spinner 445 may also have a plurality of track slots 465. A first track slot 465 may oppose a second track slot so that the mounting plate 450 may fit into the spinner 445 by way of the plurality of track slots 465. To secure the spinner 445 to the mounting plate 450, a locking tab 460 may be present on the lower surface of the spinner. The locking tab 460 may be a ridge or bulge on the lower surface of the spinner 445 that extends upwards away from the surface. When attached to the mounting plate 450, the locking tab 460 may interlock with a recess provided on the mounting plate 450. The snap fit design of the locking tab 460 and locking recess of the mounting plate may provide a secure connect between the spinner 445 and the mounting plate 450 such and normal daily operation of the smartphone 210 or personal electronic device with the attached reusable adhesive mount device 400 will not cause the spinner 445 to be dismounted or removed from the mounting plate 450. The force of attachment between the locking tab 460 and the locking recess should also be sufficient to support the reusable adhesive mount device 400 when it is attached to a non-porous or semi-porous material by way of the reusable adhesive patch 455. Furthermore, the locking tab 460 may be removed from the locking recess when sufficient force is supplied in the proper direction so that the locking tab 460 is dislodged from the recess. This will allow the user to continuously attach and detach the reusable adhesive mount device 400 via the spinner to the mounting plate 450 located on the smartphone 210.

Figure 29B:
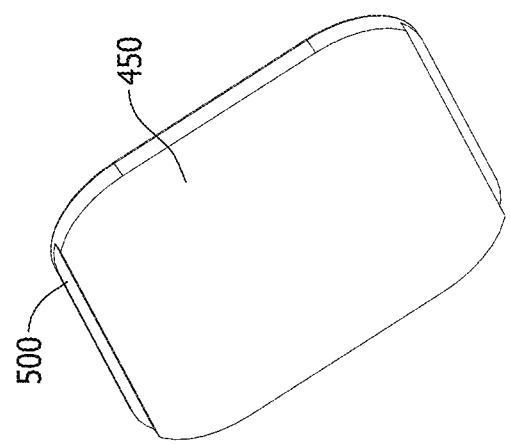
FIG. 29B illustrates the bottom surface of the mounting plate which may be used in some embodiments of the reusable adhesive mount device in an example embodiment of the disclosure.
Figure 29A:
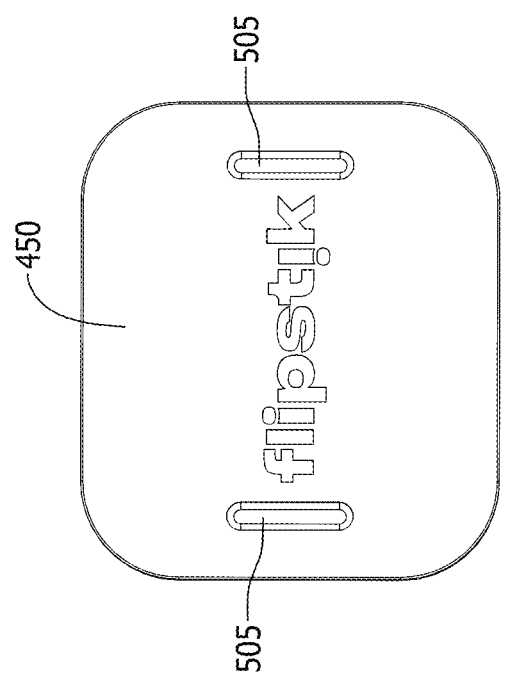
FIG. 29A illustrates the top surface of the mounting plate which may be used in some embodiments of the reusable adhesive mount device in an example embodiment of the disclosure.

FIGS. 29A and 29B show the mounting plate 450 which may be used in some embodiments of the reusable adhesive mount device 400. The top surface of the mounting plate 450 may have a locking recess 505. The locking recess 505 may be able to fit and mate with the locking tab 460 located on the spinner 445. Two locking recesses 505 may be present on opposite ends of the top surface of the mounting plate 450. The locking tab 460 can fit and mate with either locking recess 505 depending on the desired orientation of the user of the reusable adhesive mount device 400. The back surface of the mounting plate 450 is viewed in FIG. 29B. The back surface of the mounting plate may contain an adhesive layer (not shown) that can be used to securely connect the mounting plate 450 to the smartphone 210 or personal electronic device. The adhesive layer used for the mounting plate 450 is not intended to be reusable and should securely connect and be stay connected and attached to the smartphone 210. Opposing ends of the mounting plate 450 may have a mounting plate track 500. The mounting plate track(s) 500 are configured to attach to the track slot(s) 465 located on the spinner 445. The combined attachment of the mounting plate track(s) 500 within the plurality of track slots 465 along with the locking tab 460 secured in the locking recess 505 keep the reusable adhesive mount device 400 operatively connected to the mounting plate 450 and in turn the smartphone 210 or personal electronic device.

Many modifications and variations of the present disclosure are possible in light of the above teachings. It is, therefore, to be understood within the scope of the appended claims the invention may be protected otherwise than as specifically described.

The invention claimed is:

1. A device for mounting to a portable electronic apparatus comprising:
    a top portion;
    a bottom portion;
    a hinge, the hinge operatively connecting the top portion with the bottom portion;
    a reusable adhesive patch, the reusable adhesive patch connected to a top surface of the bottom portion and usable to removably secure the device to an outside surface;
    an adhesive layer, the adhesive layer connected to a bottom surface of the bottom portion and usable to secure the device to the portable electronic apparatus;
    a closed position of the device wherein a bottom surface of the top portion contacts the reusable adhesive patch; and
    an open position of the device wherein the reusable adhesive patch is able to removably secure the device to the outside surface.

2. The device of claim 1, further comprising a rod to operatively connect the top portion and the bottom portion together by way of the hinge.

3. The device of claim 2, wherein the top portion contains a first rod and the bottom portion contains a second rod, the first rod and second rod connectable to the hinge to operatively connect the top portion to the bottom portion.

4. The device of claim 1, further comprising a band secured to the top portion.

5. The device of claim 4, wherein the band is contained within a band channel depressed into the top portion.

6. The device of claim 1, further comprising an appendage recess located on a top surface of the top portion.

7. The device of claim 1, further comprising at least one protrusion on a bottom surface of the top portion.

8. A device for mounting to a portable electronic apparatus comprising:
- a top portion;
- a bottom portion;
- a first hinge and a second hinge, the first hinge operatively connecting the bottom portion with the second hinge and the second hinge operatively connecting the first hinge with the top portion;
- a reusable adhesive patch, the reusable adhesive patch connected to a bottom surface of the top portion and usable to removably secure the device to an outside surface; and
- a mounting connection, the mounting connection able to operatively secure the bottom portion to the portable electronic apparatus.

9. The device of claim 8, wherein the first hinge is a first hinge extension configured to be part of the bottom portion.

10. The device of claim 8, further comprising a plurality of pins to operatively connect the top portion to the second hinge and the second hinge to the first hinge.

11. The device of claim 8, further comprising a band secured to the top portion.

12. The device of claim 11, wherein the band is contained within a band channel depressed into the top portion.

13. The device of claim 8, further comprising an appendage recess located on a top surface of the top portion.

14. The device of claim 8, further comprising at least one protrusion on a top surface of the bottom portion.

15. The device of claim 8, further comprising a closed position of the device wherein a top surface of the bottom portion contacts the reusable adhesive patch, and an open position of the device wherein the reusable adhesive patch is able to removably secure the device to the outside surface.

16. The device of claim 8, wherein the mounting connection is a spinner able to rotate the device.

17. The device of claim 16, wherein the spinner attaches to a mounting plate, the mount plate being fixable to the portable electronic apparatus.

18. The device of claim 17 wherein the spinner has at least one track slot to facilitate attachment to the mounting plate.

19. The device of claim 17 wherein the spinner has a locking tab to mate with a locking recess of the mounting plate.

* * * * *